(12) United States Patent
Wang et al.

(10) Patent No.: US 11,960,845 B2
(45) Date of Patent: Apr. 16, 2024

(54) DECODING COMMUNICATIONS WITH TOKEN SKY MAPS

(71) Applicant: International Business Machines Corporation, Armonk, NY (US)

(72) Inventors: Ziqiumin Wang, Shanghai (CN); Qing Lu, Shanghai (CN); Wei Jun Zheng, Shanghai (CN); Xiao Feng Ji, Shanghai (CN); Yuan Jin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 17/505,779

(22) Filed: Oct. 20, 2021

(65) Prior Publication Data

US 2023/0123271 A1    Apr. 20, 2023

(51) Int. Cl.
| | | |
|---|---|---|
| *G06F 40/30* | (2020.01) | |
| *G06F 3/0482* | (2013.01) | |
| *G06F 3/04842* | (2022.01) | |
| *G06F 16/901* | (2019.01) | |
| *G06F 40/284* | (2020.01) | |
| *G06N 3/04* | (2023.01) | |

(52) U.S. Cl.
CPC ............ *G06F 40/30* (2020.01); *G06F 3/0482* (2013.01); *G06F 3/04842* (2013.01); *G06F 16/9024* (2019.01); *G06F 40/284* (2020.01); *G06N 3/04* (2013.01)

(58) Field of Classification Search
CPC ..... G06F 40/30; G06F 3/0482; G06F 3/04842
See application file for complete search history.

(56) References Cited

U.S. PATENT DOCUMENTS

| | | | |
|---|---|---|---|
| 8,010,474 B1 * | 8/2011 | Bill ....................... | A63F 13/825 |
| | | | 709/204 |
| 9,331,970 B2 * | 5/2016 | Yuen ..................... | H04L 51/063 |
| 9,542,447 B1 * | 1/2017 | Brennan ........... | G06F 16/24564 |
| 9,836,183 B1 * | 12/2017 | Love ..................... | G06F 16/904 |
| 10,387,574 B1 | 8/2019 | Anders et al. | |
| 10,467,290 B1 * | 11/2019 | Wu ..................... | G06F 16/9024 |
| 10,579,717 B2 | 3/2020 | Leydon et al. | |

(Continued)

FOREIGN PATENT DOCUMENTS

| | | |
|---|---|---|
| CN | 106484139 B | 10/2016 |
| WO | 2013085843 A1 | 6/2013 |

OTHER PUBLICATIONS

Illendula, Anurag, and Manish Reddy Yedulla. "Learning emoji embeddings using emoji co-occurrence network graph." arXiv preprint arXiv:1806.07785 (2018). (Year: 2018).*

(Continued)

*Primary Examiner* — Shaun Roberts
(74) *Attorney, Agent, or Firm* — Cantor Colburn LLP; Erik Johnson

(57) ABSTRACT

Embodiments relate to decoding communications with token sky maps. At least one electronic communication including emoticons having a non-original meaning is received. A candidate meaning is determined for the emoticons having the non-original meaning in the at least one electronic communication based at least in part on token neighborhood distribution structures. The candidate meaning for the emoticons having the non-original meaning is caused to be displayed on at least one device.

17 Claims, 23 Drawing Sheets

(56) References Cited

U.S. PATENT DOCUMENTS

| | | | |
|---|---|---|---|
| 10,599,656 B1* | 3/2020 | Sharma | G06F 16/9535 |
| 11,030,238 B2 | 6/2021 | Dimson et al. | |
| 2008/0059152 A1* | 3/2008 | Fridman | G06F 40/247 |
| | | | 704/9 |
| 2009/0171937 A1* | 7/2009 | Chen | H04L 51/04 |
| | | | 707/999.005 |
| 2013/0159919 A1* | 6/2013 | Leydon | G06F 3/04886 |
| | | | 715/780 |
| 2015/0302665 A1* | 10/2015 | Miller | G06F 3/016 |
| | | | 345/419 |
| 2015/0310093 A1* | 10/2015 | Kim | G06F 16/287 |
| | | | 707/737 |
| 2016/0203130 A1* | 7/2016 | Roque | G06F 16/3344 |
| | | | 707/741 |
| 2016/0267377 A1* | 9/2016 | Pan | G06F 40/30 |
| 2017/0185580 A1* | 6/2017 | Zhang | G06T 11/00 |
| 2017/0249291 A1* | 8/2017 | Patel | H04L 51/063 |
| 2017/0255621 A1* | 9/2017 | Kenthapadi | H04L 67/10 |
| 2017/0308267 A1* | 10/2017 | Kozloski | G06F 40/30 |
| 2018/0107945 A1 | 4/2018 | Gao et al. | |
| 2021/0141866 A1 | 5/2021 | Chen et al. | |
| 2021/0326390 A1* | 10/2021 | Aher | G06F 40/30 |

OTHER PUBLICATIONS

Eisner, Ben, et al. "emoji2vec: Learning emoji representations from their description." arXiv preprint arXiv:1609.08359 (2016). (Year: 2016).*

Vokel, "Understanding Emoji Interpretation through User Personality and Message Context"; Research Gate; MobileHCI '19, Oct. 1-4, 2019; 13 p.

Wang, "Learning Deep Structure-Preserving Image-Text Embeddings"; Proceedings of the IEEE Conference on Computer Vision and Pattern Recognition (CVPR), 2016, pp. 5005-5013; 10p.

* cited by examiner

FIG. 4
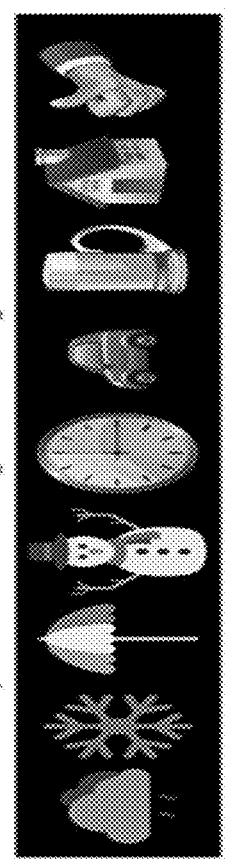
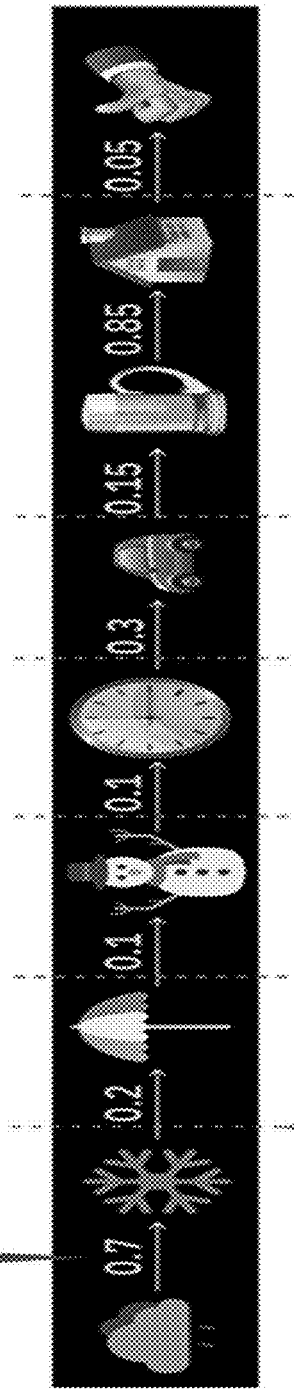

ADJACENCY MATRIX 902

FIG. 11

FEATURE MATRIX

| | | | | | |
|---|---|---|---|---|---|
| 0.286 | 0 | 0 | 0 | 0 | 0 |
| 0 | 0.238 | 0 | 0 | 0 | 0 |
| 0 | 0 | 0.19 | 0 | 0 | 0 |
| 0 | 0 | 0 | 0.142 | 0 | 0 |
| 0 | 0 | 0 | 0 | 0.095 | 0 |
| 0 | 0 | 0 | 0 | 0 | 0.047 |

Node 0, Node 1, Node 2, Node 3, Node 4, Node 5 — VECTORS

FIG. 13

1-layer GCN formula:

$$H^{(l+1)} = \sigma\left(\widetilde{D}^{-1/2} \widetilde{A} \widetilde{D}^{-1/2} H^{(l)} W^{(l)}\right)$$

$$\widetilde{A} = A + I$$

$$\widetilde{D}_{ii} = \sum_j \widetilde{A}_{ij}$$

- $A$ is unweighted adjacency matrix.
- $I$ is an identity matrix.
- Feature matrix $X$ is the feature matrix.
- Each parameter matrix $W$ is randomly initialized.
- $\sigma(\cdot)$ is the non-linear activation function *ReLU*.
- $\widetilde{D}$ is the diagonal node degree matrix of $\widetilde{A}$.

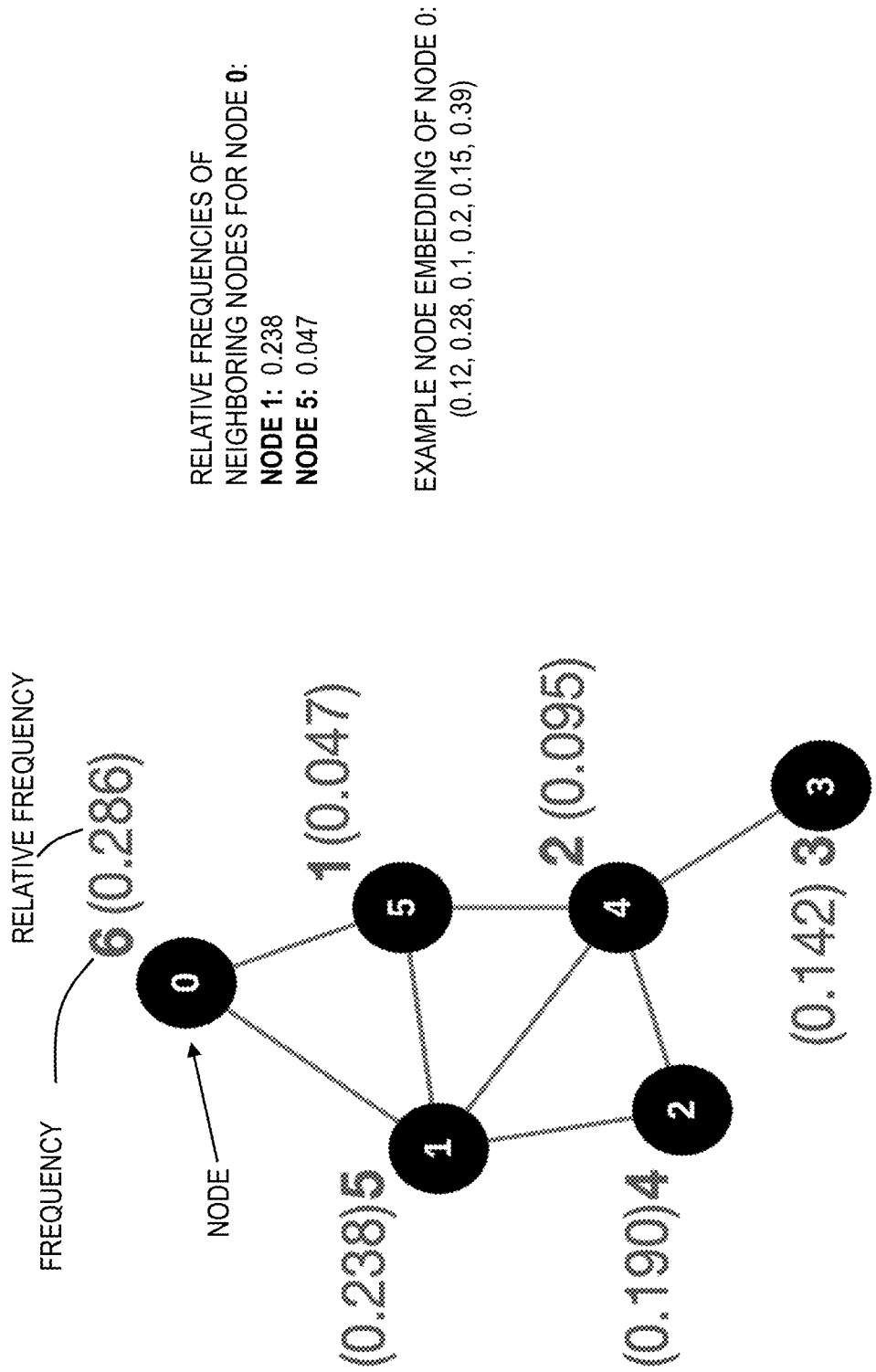

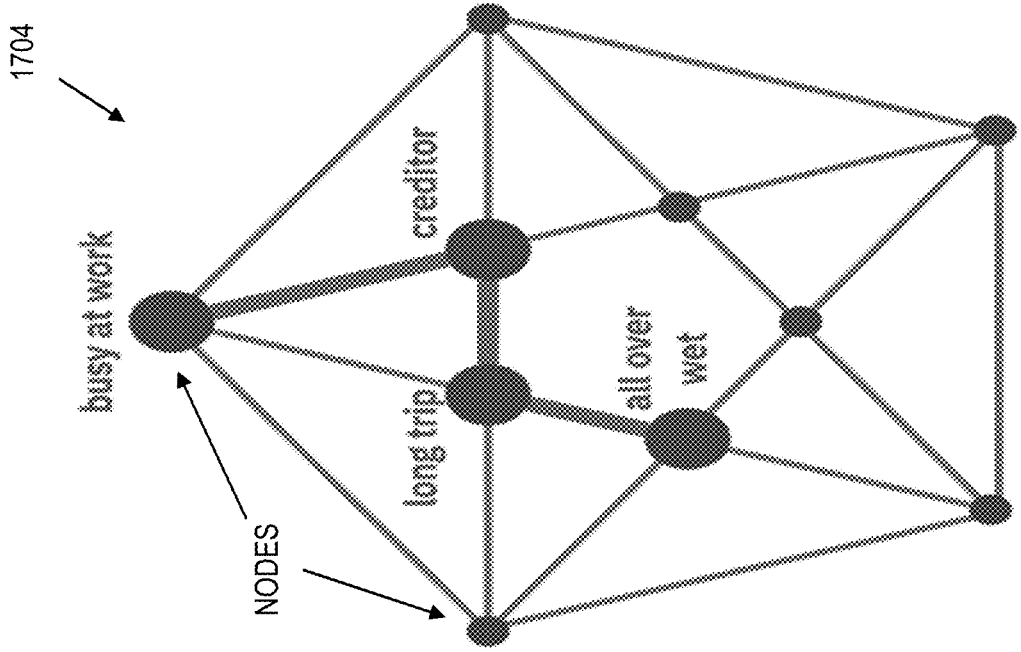
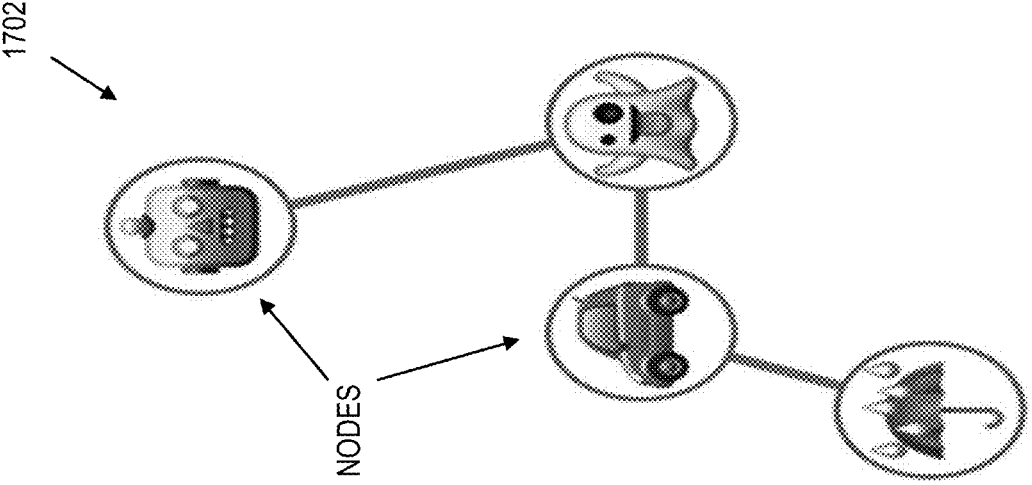
FIG. 17

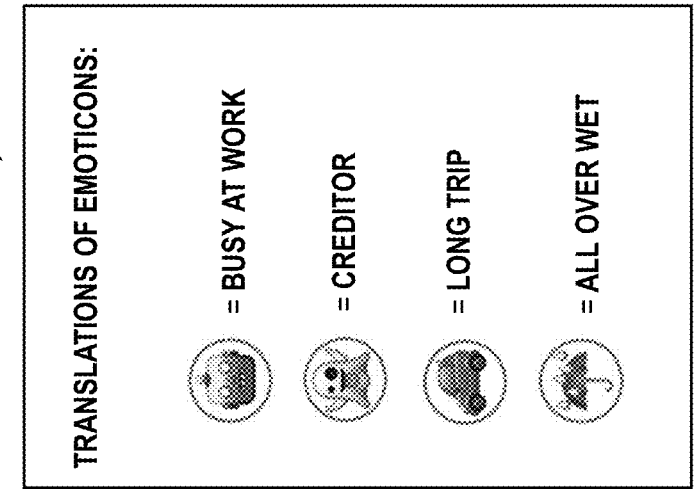
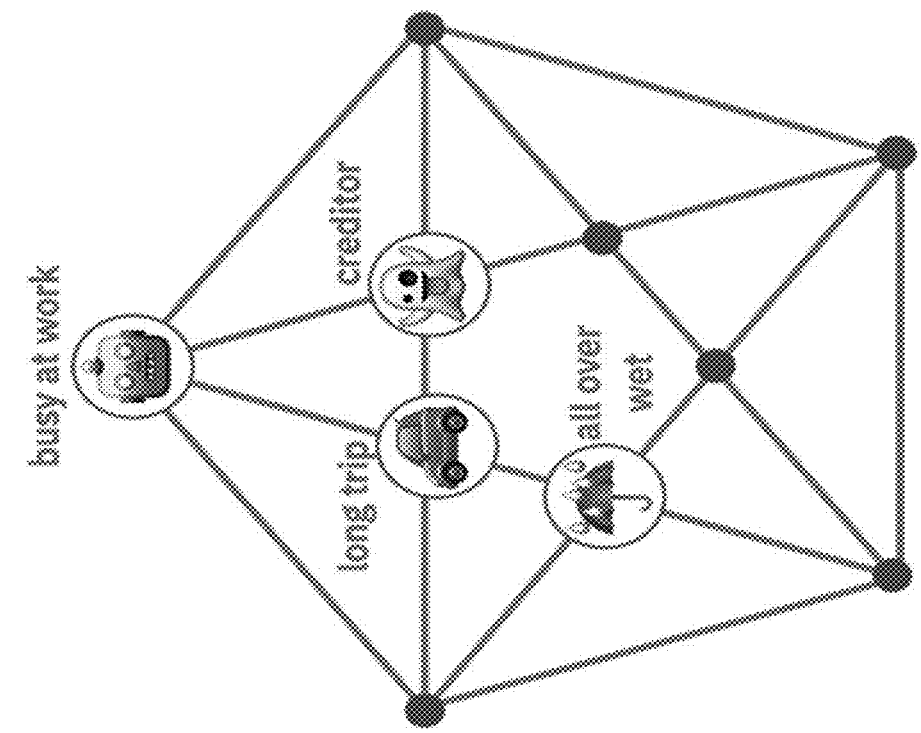
FIG. 18
FIG. 17

DECODING COMMUNICATIONS WITH TOKEN SKY MAPS

BACKGROUND

The present invention generally relates to computer systems, and more specifically, to computer-implemented methods, computer systems, and computer program products configured and arranged for decoding communications with token sky maps, and particularly to employing an intelligent technique to comprehend non-original-meaning emoticons with token sky maps.

Communication describes a process in which two or more devices transfer data, instructions, and information. Some communications involve cables and wires, while others are sent wirelessly through the air. Communication systems refer to all types of computers and computing devices. For successful communications, the communication systems include a sending device that initiates an instruction to transmit data, instructions, or information; a communication channel and/or or transmission media on which the data, instructions, or information travel, where the communication channel connects to the sending device; and a receiving device connected to the communication channel in order to accept the transmission of data, instructions, or information. Many electronic messages are sent and received over the communication channel from one device to another. Sometimes, these messages are encoded and thus have to be decoded. Decoding is the process of translating received electronic messages into codewords of a given code so that the user of the receiving device understands the message.

SUMMARY

Embodiments of the present invention are directed to computer-implemented methods for decoding communications with token sky maps, and particularly employing an intelligent technique to comprehend non-original-meaning emoticons with token sky maps. A non-limiting example computer-implemented method includes receiving at least one electronic communication comprising emoticons having a non-original meaning and determining a candidate meaning for the emoticons having the non-original meaning in the at least one electronic communication based at least in part on token neighborhood distribution structures. The computer-implemented method includes causing the candidate meaning for the emoticons having the non-original meaning to be displayed on at least one device.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts a block diagram of an example of tokenizing sentences expressed through non-original-meaning emoticons according to one or more embodiments of the present invention;

FIG. 11 depicts an example feature matrix of the token sky map in FIG. 10. according to one or more embodiments of the present invention;

FIG. 13 depicts an example one-layer formula of the GCN according to one or more embodiments of the present invention;

FIG. 14 depicts an example emoticon token sky map along with the node embedding of graph node 0 according to one or more embodiments of the present invention;

FIG. 17 depicts an example of overlapping a simplified token sky map of emoticons and a simplified token sky map of plaintext according to one or more embodiments of the present invention;

FIG. 18 depicts an overlapped token sky map of emoticons and plaintext from FIG. 17 along with translations/meanings of the emoticons according to one or more embodiments of the present invention;

DETAILED DESCRIPTION

Figure 1:
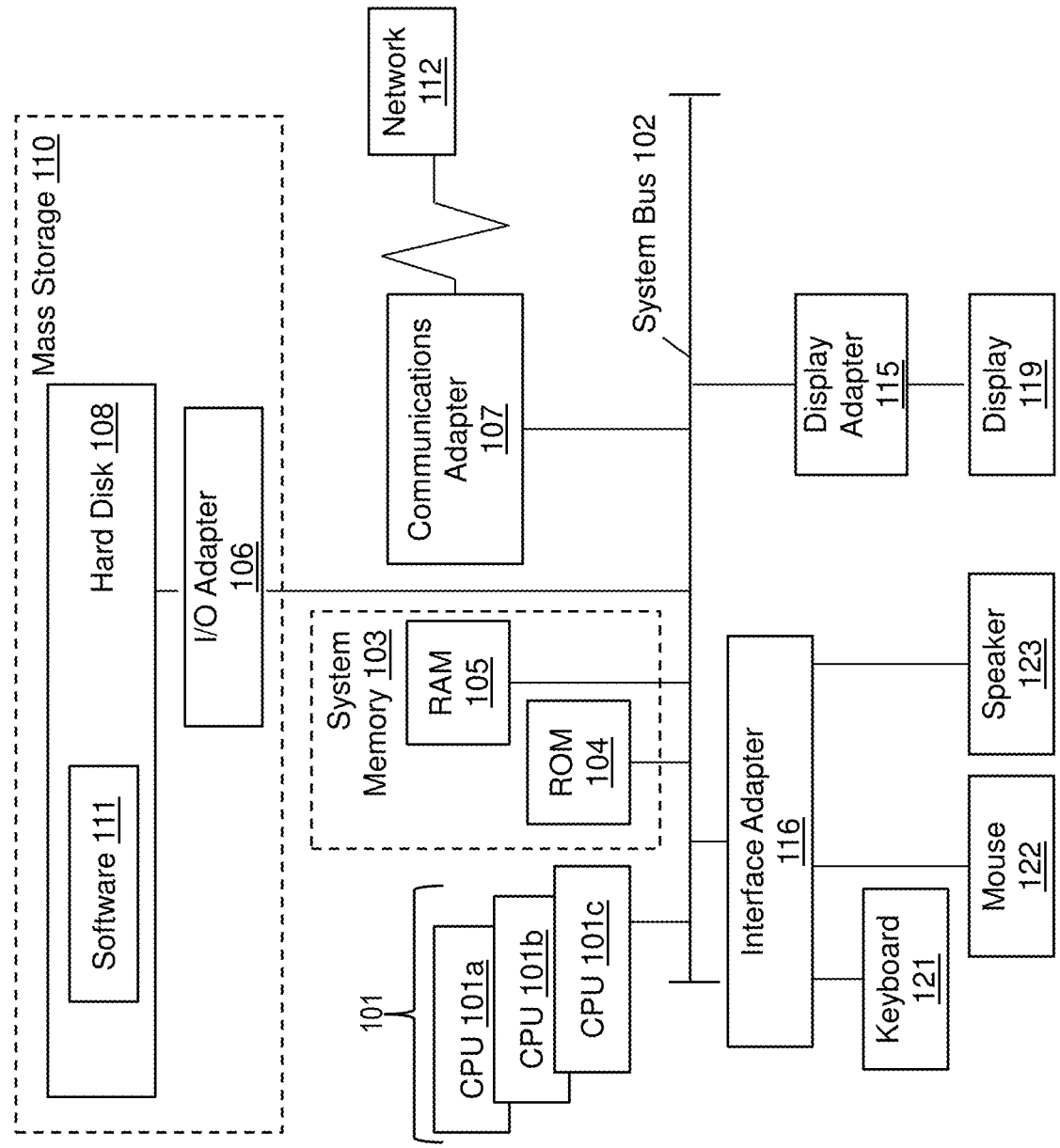
FIG. 1 depicts a block diagram of an example computer system for use in conjunction with one or more embodiments of the present invention.

One or more embodiments of the present invention provide computer-implemented methods, computer systems, and computer program products arranged and configured for decoding communications with token sky maps, and particularly to employing an intelligent technique to comprehend non-original-meaning emoticons with token sky maps. One or more embodiments of the present invention provide an intelligent method to identify meanings of non-original-meaning emoticons according to token neighborhood distribution structures that have been built. Novel techniques are discussed for generating a token sky map, which is a special kind of undirected and unweighted topological graph that can represent neighbor relationship of tokens for non-original-meaning emoticons and/or plaintext words according to one or more embodiments of the invention. One or more embodiments of the invention are configured to identify the distribution location of the non-original-meaning emoticon token sky map in the plaintext token sky map, thereby providing the meaning of the non-original-meaning emoticons. A graph convolution network (GCN) model can be used to obtain node embeddings of each node in the token sky maps for comparison in order to determine an overlap between nodes in the non-original-meaning emoticon token sky map and in the plaintext token sky map.

An emoji is a pictogram, logogram, ideogram, and/or smiley used in electronic messages and web pages. The primary function of an emoji is to fill in emotional cues otherwise missing from typed conversation. Some examples of emojis are smiley face, heart, car, flag, etc., as ubiquitously used on smart phones. Emojis exist in various genres, including facial expressions, common objects, places and types of weather, and animals. Emojis are much like emoticons which are typographic approximations. The terms emoticons and emojis can be used interchangeably herein, although emojis are pictures rather than typographic approximations of pictures. Accordingly, the use of emoticons herein is defined to include emojis as well.

Users of electronic communication devices use emoticons more and more in online communication to deliver different information, such as agreement, happiness, encouragement, etc. Emoticons are an alternate way to convey nuances, and in some instances, also have the ability to produce an emotion or thought across language and cultural barriers. While an emoticon is originally defined with its intentional meaning, people might use the emoticon to mean other things, especially varying in cultures, geographies, and/or interests. As such, non-original-meaning emoticons are used, combined, and/or communicated in a way that is different from the originally defined and intended meaning of the emoticon; therefore, non-original-meaning emoticons convey a different meaning from an emoticon having its original meaning. Misunderstanding of the sender's emoticon intent might cause unnecessary confusion. For example, different generations might use the same emoticons for different meanings too. For instance, the emoticon with the official meaning of a smile might be used by one generation very differently than another generation, where one generation may use the smile (or smiley face) to convey "it's boring", "I'm not interested in talking with you", etc. In such a case, the smile is not an emoticon that everyone would like to receive, thereby conveying a non-original-meaning and/or being a non-original-meaning emoticon. However, this emoticon is welcomed by those in a different generation when they use its original meaning to express happiness. Further, decoding emoticons in electronic communications becomes much harder when people talk/communicate in pure emoticons, in other words without words. Pure emoticons or communicating in a pure emoticon sentences is a sentence that has a string of one or more emoticons without plaintext, which is without words made of syllables or letters.

Although there are some emoticon translation tools, which translate emoticon messages by setting up a lexicon to match one emoticon to one word or phrase when the original meaning of the emoticon is known; such translation tools are unable to work in a situation where there are non-original-meaning emoticons because one does not know the exact meaning of any of the non-original-meaning emoticons. In accordance with one or more embodiments of the invention, token sky maps are built to comprehend non-original-meaning emoticons more accurately and intelligently. Because people all over the world live in the same physical environment, although the non-original-meaning emoticons seem to be a sort of code word, the distribution and association of the things referred to by such emoticons should be very similar to the equivalent plaintext. Therefore, one or more embodiments of the invention can use this spatial distribution, which is based on frequency and contexts of words in plaintext and emoticons, in order to identify the most likely meaning of each code word represented by those emoticons through overlapping the code word with a plaintext word. Because one does not know the exact meaning of any non-original-meaning emoticon, one or more embodiments of the invention uses a novel method to represent the spatial distribution structure of code words (i.e., emoticons) and plaintexts in what is called a token sky map. To identify the meanings of emoticons through use of the token sky maps according to one or more embodiments of the invention, it is like matching a spatial distribution structure (similar to a constellation of stars in a mobile application) of non-original-meaning emoticons to its corresponding spatial distribution structure map of plaintext words (such as a constellation in the actual sky).

Various technical benefits and technical solutions are provided by decoding electronic communications with token sky maps to comprehend and display on devices non-original-meaning emoticons with token sky maps. Electronic displayable communications by their very nature require computer systems for generation and display of content. Electronic communications can be displayed in various electronically generated online communications including but not limited to text messages, emails, chat sessions/windows, message boards, etc., on a communication device. Accordingly, one or more embodiments improve electronic communication and/or online communication of communication devices over a network by determining the meaning of and graphically displaying decoded non-original-meaning emoticons for the benefit of users of communication devices.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
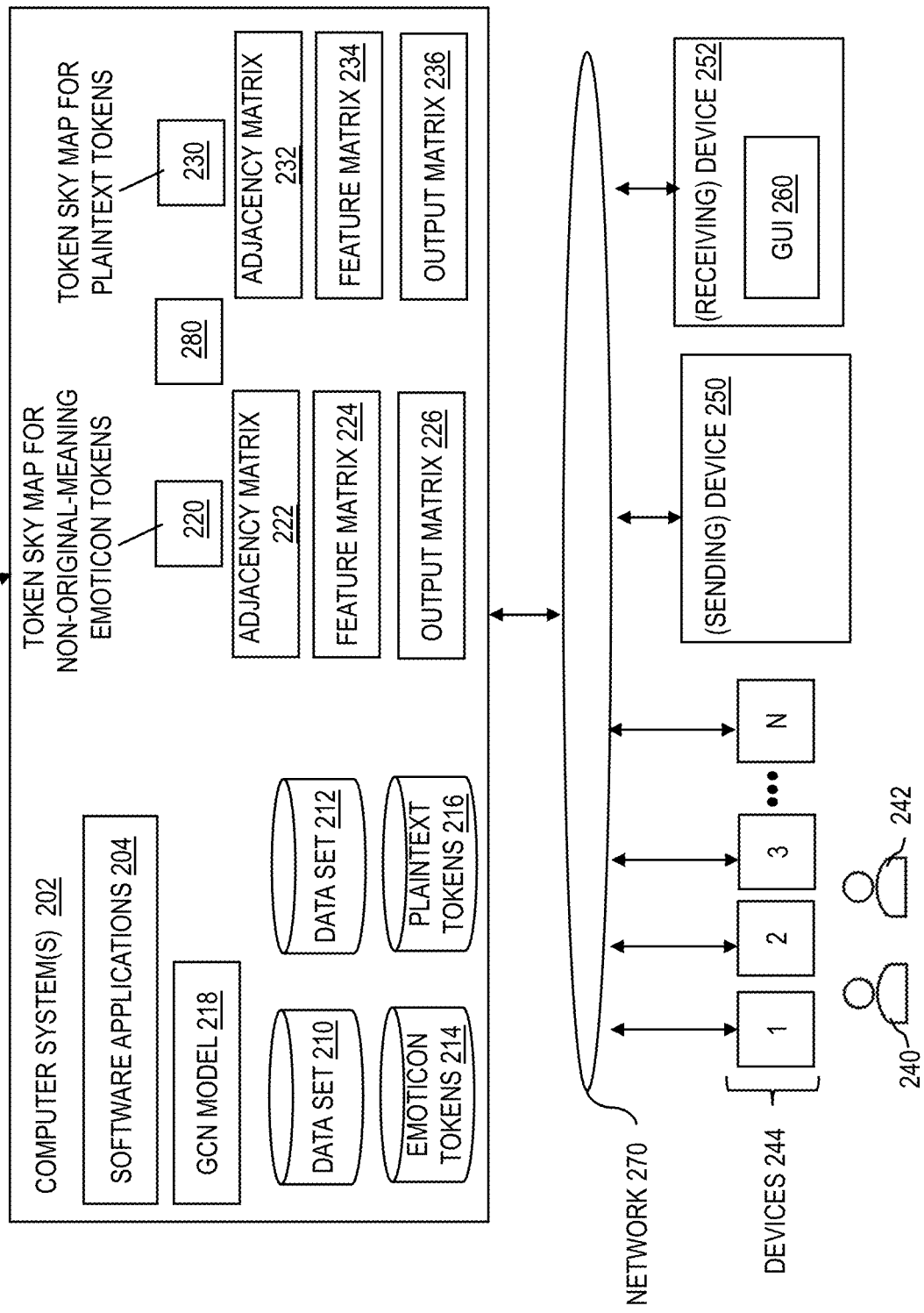
FIG. 2 depicts a block diagram of an example computing environment which is configured for decoding electronic communications with token sky maps and generating a graphical display of the decoded electronic communications according to one or more embodiments of the present invention.

FIG. 2 is a block diagram of an example computing environment 200 which is configured for decoding electronic communications using token sky maps, and particularly employing an intelligent technique to comprehend non-original-meaning emoticons with token sky maps according to one or more embodiments of the inventions. Computing environment 200 is utilized to cause the decoded electronic communications to be displayed for one or more users of communication devices. Computing environment 200 can include computer system(s) 202, devices 244, sending device 250, and receiving device 252, any of which may include any of the hardware and software components and functionality discussed in computer system 100 of FIG. 1. For example, software applications in computer system 202 including software application 204, devices 244, sending device 250, and receiving device 252 can include features of software 111 and be executed on processors such as processors 101. Computing environment 200 may be representative of one or more portions of a cloud computing environment. Functions of computing environment 200 can use and/or be implemented in workloads of workload layer 90 and any of the components of hardware and software layer 60 depicted in FIG. 23.

Figure 3:
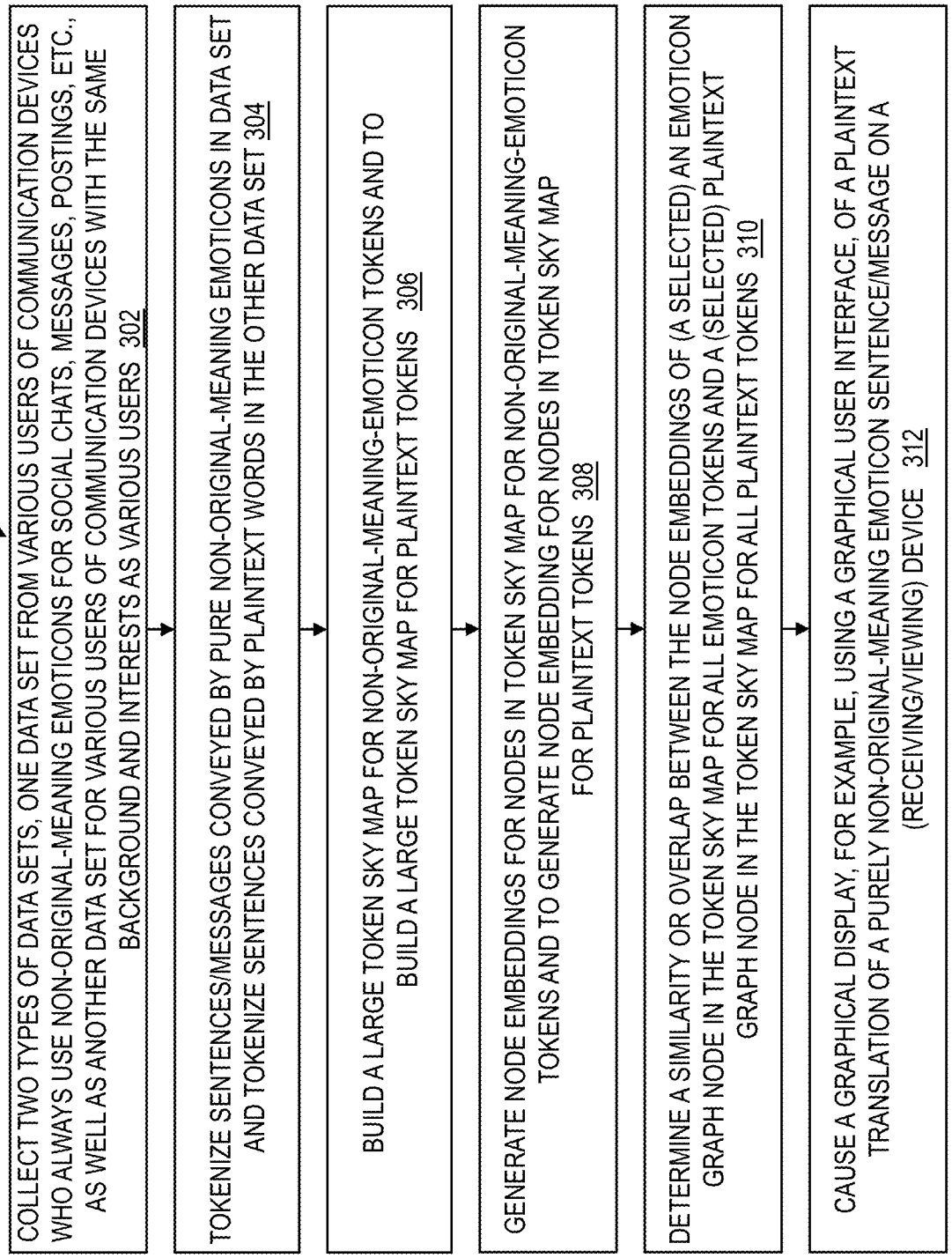
FIG. 3 is a flowchart of a computer-implemented process for decoding electronic communications with token sky maps and generating a graphical display of the decoded electronic communications according to one or more embodiments of the present invention.

FIG. 3 is a flowchart of a computer-implemented process 300 for decoding electronic communications using token sky maps, and particularly employing an intelligent technique to comprehend non-original-meaning emoticons with token sky maps in accordance with one or more embodiments. Reference can be made to FIG. 2 when executing computer-implemented process 300.

At block 302 of computer-implemented process 300, software application 204 is configured to collect two types of data sets, one data set 210 from various users 240 of communication devices who always like to use non-original-meaning emoticons for online communications including social chats, messages, postings, etc., as well as another data set 212 for various users 242 of communication devices with the same background and interests as various users 240 but use plaintext sentences. Moreover, data set 210 is a historical collection of pure non-original-meaning emoticon sentences as code words without plaintext. Unlike data set 210, data set 212 is a historical collection of plaintext sentences. Non-original-meaning emoticon users 240 have similar and/or the same demographics, characteristics, social media habits, buying/consumer habits, travel habits, educational background, hobbies, etc., as plaintext users 242. As a result of parsing, retrieval, and storing by software application 204, which may employ one or more application programming interfaces (APIs), other software applications, bots, scrappers, and other collection techniques, etc., data set 210 contains sentences in non-original-meaning emoticons while data set 212 contains plaintext sentences.

Non-original-meaning emoticon users 240 and plaintext users 242 can utilize one or more communication devices 244, 250, 252 and access services and/or communicate with one or more other devices 244, 250, 252. Devices 244, 250, 252 can represent various computing devices connected over a network 270 including mobile devices, servers, computers, smart phones, etc. Devices 244, 250, 252 can be used for communicating between devices, hosting/communicating on social media websites, hosting/communicating on posts, hosting/communicating on websites and electronic platforms, hosting/communicating on messaging boards, etc. From these online communication sources (which can include servers and websites providing the online communications), software application 204 is configured to collect and store in data set 210 sentences expressed in non-original-meaning emoticons from within all their available historical online communications (including chat records and posts) for users 240, 242 of various devices 244, 250, 252 along with collecting and storing in data set 212 sentences in plaintext. In one or more embodiments, having data set 210 with sentences in non-original-meaning emoticons means that no plaintext (i.e., words, phrases, etc.) are used in the non-original-meaning emoticon sentences, such that the sentences are formed by having emoticons (also referred to as emojis) adjacent to one another.

At block 304, software application 204 is configured to tokenize sentences/messages conveyed by pure non-original-meaning emoticons in data set 210 and tokenize sentences/messages conveyed by plaintext words in data set 212. According to the frequency of non-original-meaning emoticons and plaintext words, software application 204 is configured to respectively perform tokenization and/or cause tokenization to be performed using, for example, existing natural-language-processing (NLP) tokenization technologies (such as a Hidden Markov Model), on those sentences stored in the collected data sets 210, 212 respectively. For plaintext sentences, existing phrase extraction technology can also be used to further extract out phrases composed of plaintext words, and/or available phrase libraries can be used for identifying phrases directly.

Software application 204 is configured to tokenize the sentences in non-original-meaning emoticons in data set 210 into emoticon tokens stored in emoticon tokens 214. Analogously, software application 204 is configured to tokenize the sentences in plaintext words in data set 212 into plaintext tokens stored in plaintext tokens 216. FIG. 4 is a block diagram of an example of tokenizing sentences expressed through non-original-meaning emoticons. In FIG. 4, block 402 is an example sentence expressed in non-original-meaning emoticons, for example, from data set 210. Block 404 is an example of the tokenization of the sentence in block 402 using co-occurrence frequency between neighboring emotions. Software application 204 determines the co-occurrence frequency between any pair of emoticons based on sentences in data set 210 and uses the co-occurrence frequency to segment one or more emoticons into a token. Co-occurrence or cooccurrence is the frequency of occurrence of two terms (also known as coincidence or concurrence). A co-occurrence frequency threshold could be utilized to determine when to join two or more emoticons as a single token. In block 404, segments lines show where emoticons have been tokenized based on their co-occurrence frequency.

Figure 5:
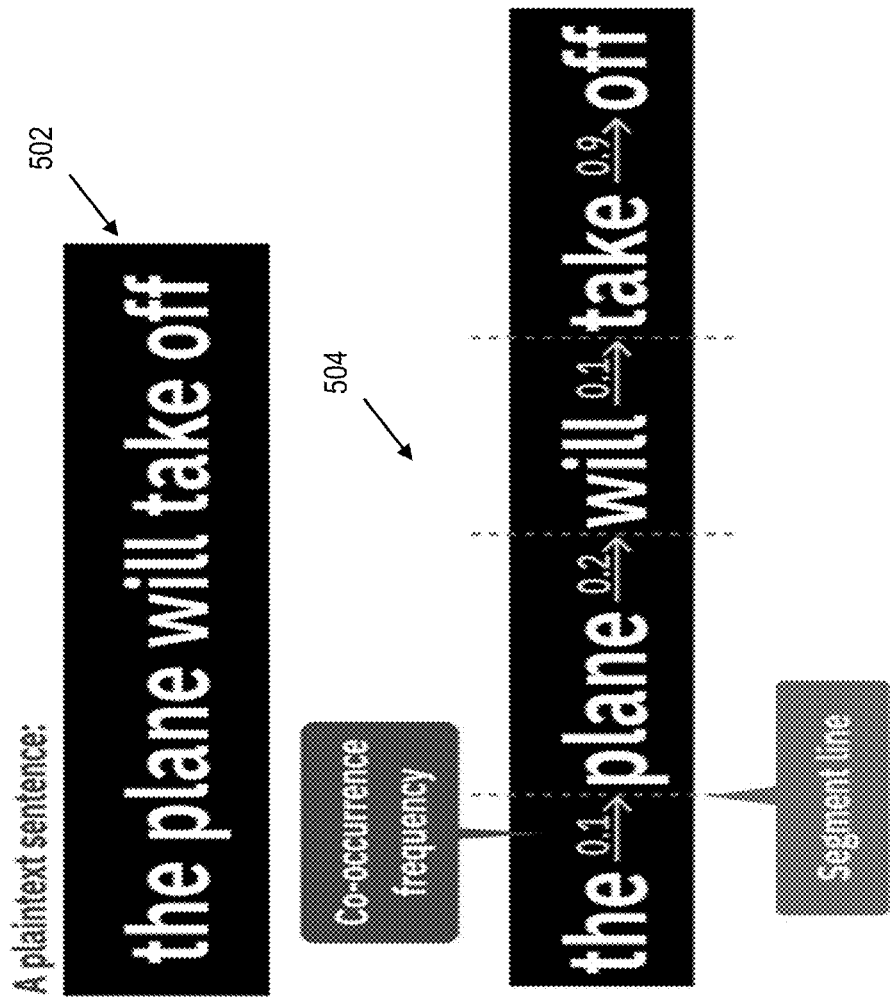
FIG. 5 depicts a block diagram of an example of tokenizing sentences expressed through plaintext sentences according to one or more embodiments of the present invention.

FIG. 5 is a block diagram of an example for tokenizing sentences expressed through plaintext sentences. In FIG. 5, block 502 is an example plaintext sentence. Block 504 is an example of the tokenization of the plaintext sentence in block 502 using co-occurrence frequency between neighboring words. A co-occurrence frequency threshold could be utilized to determine when to join two or more words as a single token.

Figure 6:
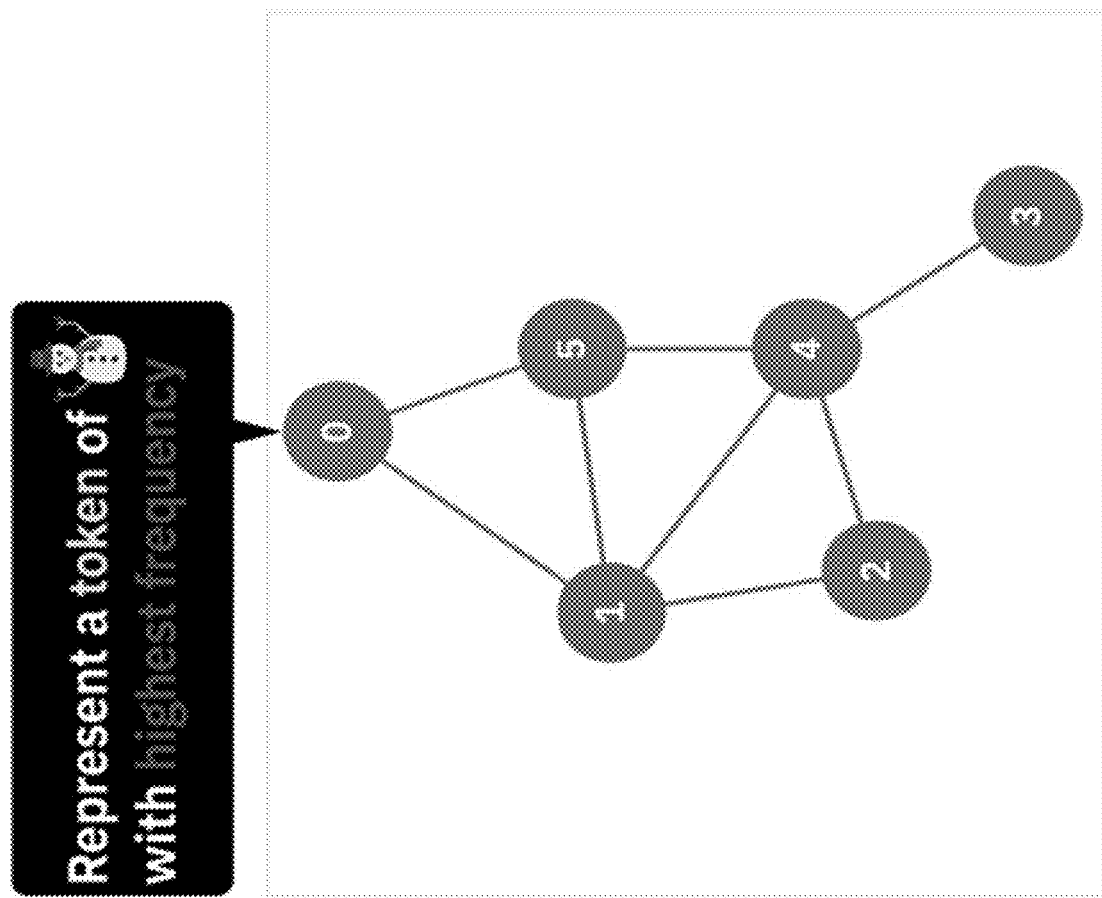
FIG. 6 depicts a topological graph of an example token sky map for non-original-meaning-emoticon tokens according to one or more embodiments of the present invention.
Figure 7:
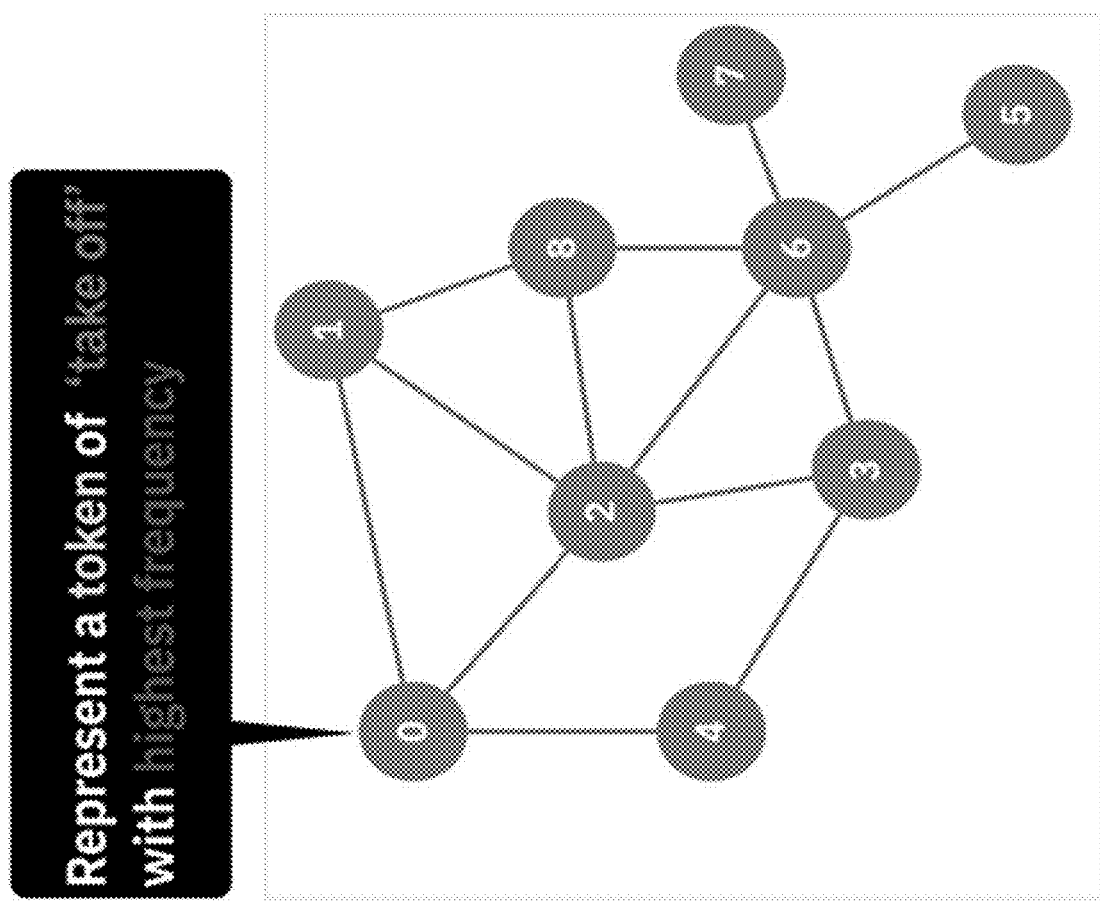
FIG. 7 depicts a topological graph of an example token sky map for plaintext tokens according to one or more embodiments of the present invention.

Referring to FIG. 3, at block 306, software application 204 is configured to build a large token sky map 220 for non-original-meaning-emoticon tokens and to build a large token sky map 230 for plaintext tokens. As noted herein, a token sky map is a special kind of undirected and unweighted topological graph defined according to one or more embodiments of the invention. Based on the historical neighbor relationship of tokens (from block 304) belonging to data sets 210 and 212 respectively, software application 204 is configured to construct token sky map 220 for non-original-meaning-emoticon tokens and token sky map 230 for plaintext tokens. FIG. 6 depicts a topological graph of an example token sky map 220 for non-original-meaning-emoticon tokens according to one or more embodiments. FIG. 7 depicts a topological graph of an example token sky map 230 for plaintext tokens.

Although two token sky maps 220 and 230 are built respectively, an example scenario is provided below for building an example token sky map which can apply to any emoticon token or plaintext token. In general, a token in the example token sky can be representative by analogy to an emoticon token or a plaintext token.

Figure 8:
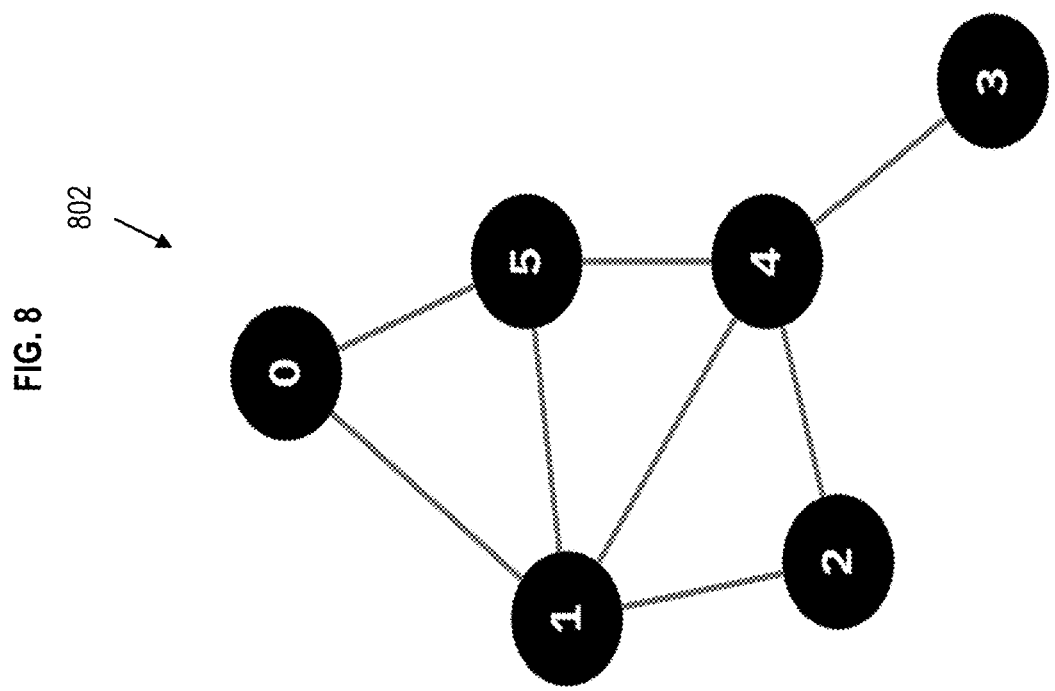
FIG. 8 depicts an example token sky map as an undirected and unweighted topological graph according to one or more embodiments of the present invention.
Figure 9:
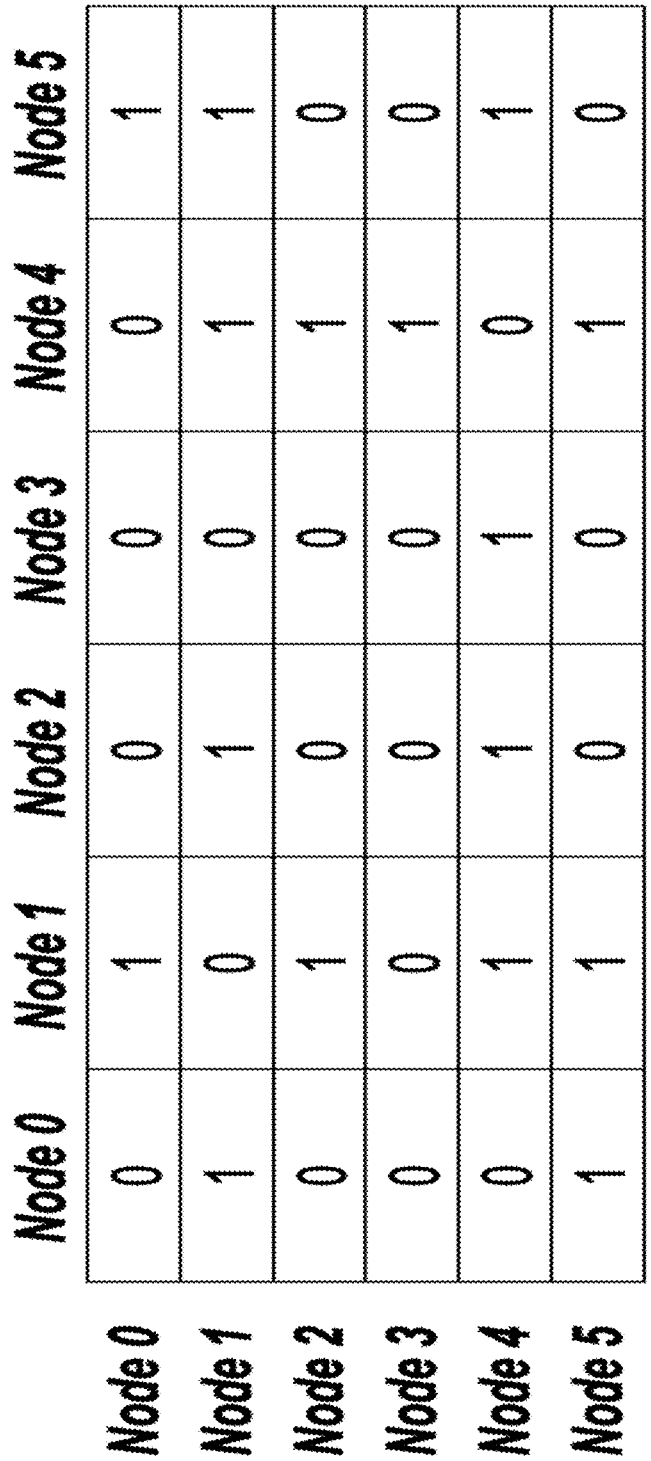
FIG. 9 depicts an example adjacency matrix of the token sky map in FIG. 8 according to one or more embodiments of the present invention.

A token sky map is a specially designed topological graph G=(V, E), where G represents a graph, V indicates a set of graph nodes and E indicates a set of undirected and unweighted connecting edges. Each graph node in such a topological graph represents a token. In the large token sky map 220 for all emoticon tokens, each graph node represents an emoticon token. Similarly, in the large token sky map 230 for all plaintext tokens, each graph node represents a plaintext token. If two emoticon tokens were adjacent to each other appearing in a historical emoticon message in data set 210, then in the token sky map 220 for all emoticon tokens, software application 204 is configured to construct a connecting edge (i.e., a line) between their respective graph nodes. Analogously, if two plaintext tokens were adjacent to each other appearing in a historical plaintext message in data set 212, then in the token sky map 230 for all plaintext tokens, software application 204 is configured to construct a connecting edge between their respective graph nodes. In both token sky maps 220, 230, any connecting edge has no directions (also known as a "undirected edge"), and the weight of any edge is always equal to value 1 thereby being an "unweighted edge". For the example token sky map 802 depicted in FIG. 8, which is an undirected and unweighted topological graph (that can apply by analogy to token sky map 220 and/or token sky map 230), the corresponding adjacency matrix A is depicted as matrix 902 in FIG. 9. In the adjacency matrix A depicted in FIG. 9, value "1" indicates two graph nodes have a connecting edge and value "0" indicates two graph nodes have no connecting edge. Accordingly, software application 204 generates an adjacency matrix 222 corresponding to token sky map 220 for non-original-meaning-emoticon tokens and generates an adjacency matrix 232 corresponding to token sky map 230 for plaintext tokens.

Figure 10:
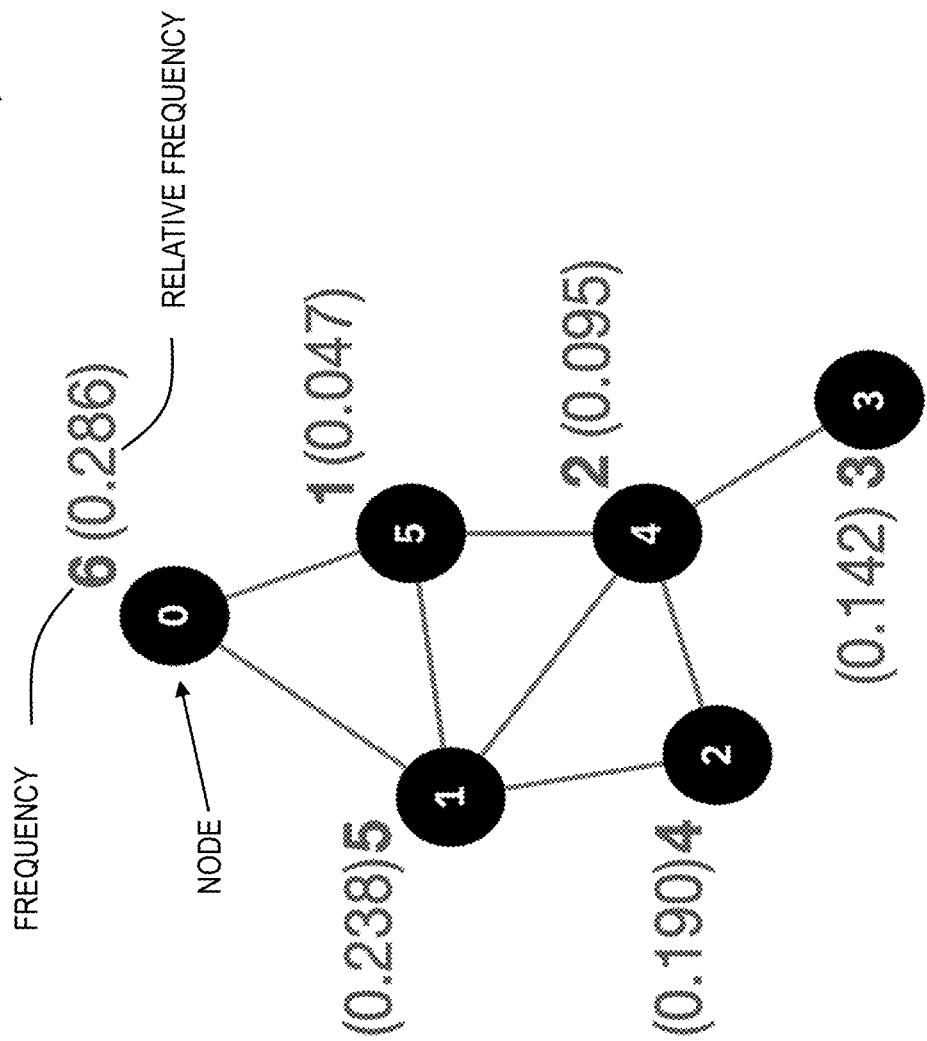
FIG. 10 depicts the example token sky map in FIG. 8 with further processing according to one or more embodiments of the present invention.

For the example token sky map 802, FIG. 10 illustrates an example token sky map with further processing by software application 204 to generate a feature matrix depicted in FIG. 11 according to one or more embodiments. In FIG. 10, the frequency of each token is represented by a solid number outside of the node, and the floating-point numbers depicted within parentheses are the relative frequency of each token. The frequency of each token is the number of occurrences of a token in its respective table of tokens (e.g., emoticon tokens 214, plaintext tokens 216), for example, as determined by software application 204. As noted herein, the index is the number within the graph node. Software application 204 can use the following formula: RelativeFrequency=(frequency$_i$)/$\Sigma_i^N$ frequency$_i$, where N is the number of graph nodes and i is the graph node index. For example, for the graph node with index 0 in FIG. 10, its relative frequency is equal to $$\frac{6}{1+2+3+4+5+6} = 0.286.$$

According to the frequency of each token in the history (non-original-meaning emoticon tokens 214 derived from data set 210 and plaintext tokens 216 derived from data set 212), its corresponding graph node is assigned with a unique index starting from 0. The higher the frequency number is then the smaller the index number is. The frequency number of a graph node has an inverse relationship to the index number. Taking the following example, it is assumed that there are a total of 4 graph nodes A, B, C and D in a token sky map, and their respective frequencies are 3, 1, 4 and 2. Then: a) Sort the four nodes in descending order according to their respective frequencies, and the sorted list is below: Node C->Node A->Node D->Node B; b) Assign a node index to four nodes from left to right, starting from index 0, and the node indexes are as follows: Node C (assigned node index=0)->Node A (assigned node index=1)->Node D (assigned node index=2)->Node B (assigned node index=3).

For the example token sky map 802 in the example scenario, its feature matrix X is depicted in FIG. 11. In FIG. 11, the feature matrix X is defined as N * N matrix, where N is the number of all nodes in a token sky map. Here, N=6 for the example token sky map 802 because there are 6 graph nodes, so the feature matrix has 6 rows and 6 columns in FIG. 11. Each row in this feature matrix represents the feature (i.e., vector) of a token. For example, the feature of node 0 can be denoted as a vector (0.286, 0, 0, 0, 0, 0), wherein 0.286 is the relative frequency of node 0. As depicted in FIG. 11, the feature matrix uses relative frequencies instead of frequencies. In a feature matrix, each row represents the feature (vector) of a graph node. For example, the first row in a feature matrix indicates the feature (vector) of the graph node with node index=0. In such a feature vector, only the (vector) dimension with dimension index=i has a non-zero value which represents the relative frequency of the graph node with node index=i; other (vector) dimensions are just zeros. For example, suppose there are total six graph nodes in a token sky map. To set the feature vector of the graph node with node index=2, the relative frequency (e.g., 0.19) of the graph node with node index=2 is put into the (vector) dimension with dimension index=2 in a feature vector and other (vector) dimensions are set as zeros, so this results in (0, 0, 0.19, 0, 0, 0) as the feature (vector) of node 2.

As discussed herein for example token sky map 802, software application 204 generates a feature matrix 224 for nodes in token sky map 220 for non-original-meaning-emoticon tokens using relative frequency for each node. Analogously, software application 204 generates a feature matrix 234 for nodes in token sky map 230 for plaintext tokens using relative frequency for each node.

Referring to FIG. 3, at block 308, software application 204 is configured to generate node embeddings for nodes in token sky map 220 for non-original-meaning-emoticon tokens and to generate node embeddings for nodes in token sky map 230 for plaintext tokens. Software application 204 can use, call, and/or employ a model 218 to generate the node embeddings for nodes in token sky maps 220, 230, respectively.

Figure 12:
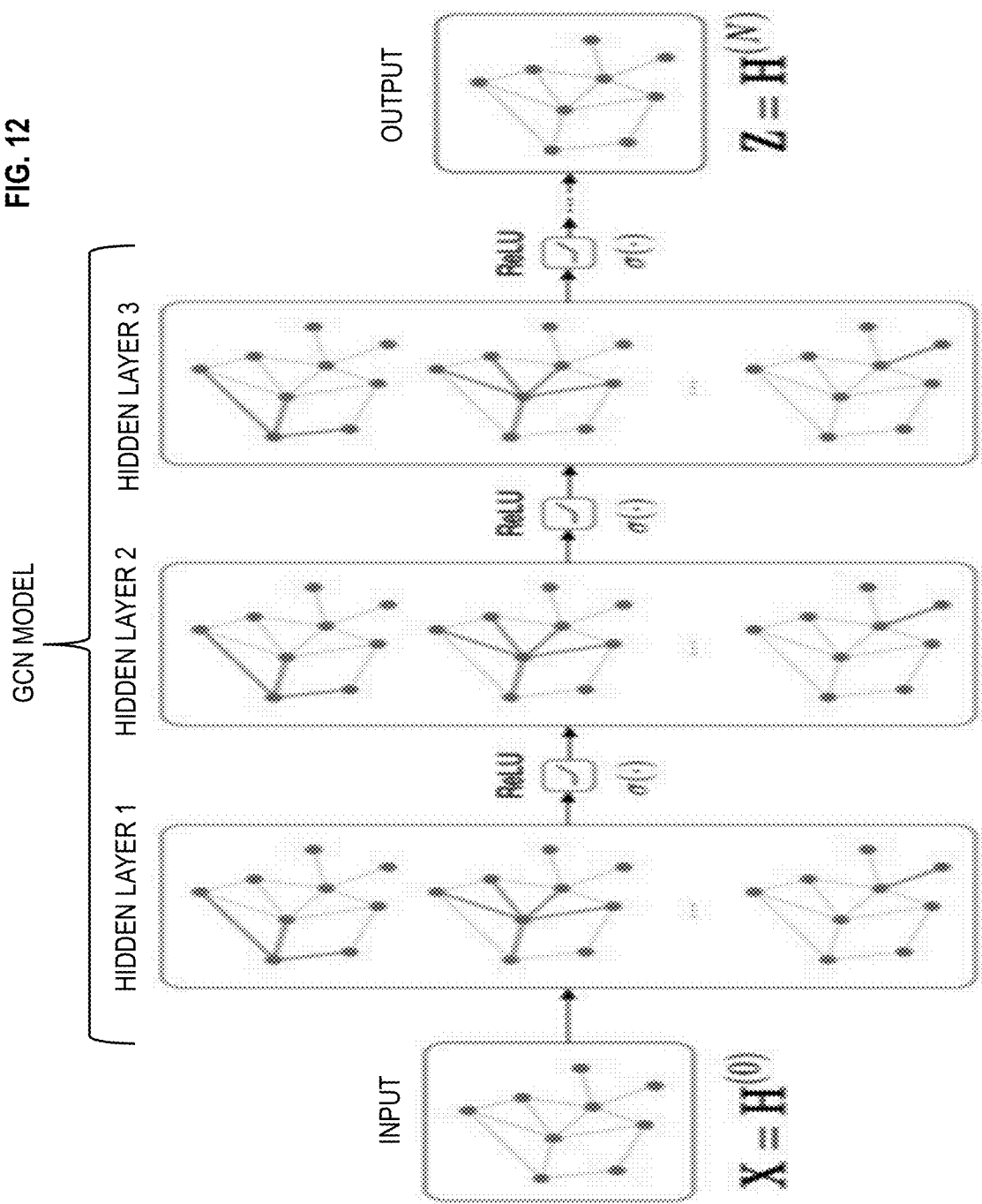
FIG. 12 depicts an example graph convolution network (GCN) model according to one or more embodiments of the present invention.

In one or more embodiments, model 218 can be a trained deep learning network. As an example model, FIG. 12 illustrates a 3-layer graph convolution networks (GCN) model structure, and FIG. 13 illustrates the 1-layer formula of the GCN. The number of GCN layers can be considered as a hyper-parameter N, and the selection range of N can be [1, 5] in one or more embodiments, which is selected based on the total number of graph nodes and the number of neighboring graph nodes to be involved to extract graph features. The feature matrix X is input into a N-layer GCN model as depicted in FIG. 12. Meanwhile, the adjacency matrix A is used by the 1-layer GCN formula in FIG. 13. In FIGS. 12 and 13 as appropriate, A is the unweighted adjacency matrix, I is an identity matrix, feature matrix X is the feature matrix, each parameter matrix W is randomly initialized, σ(•) is the non-linear activation function ReLU, and $\tilde{D}$ is the diagonal node degree matrix of $\tilde{A}$. In FIG. 12, it particularly shows a 3-layer GCN, which includes from left to right, let's call them 'layer 1', 'layer 2' and 'layer 3' respectively. Each layer has its own randomly initialized parameter matrix W. The 1-layer GCN formula is used by those three layers in the same way, but with different input, parameter matrix, and output for each layer. In FIG. 12, the input and output of each layer are as below: for 'layer 1': input is $H^0$ and output is $H^1$, where $H^0$ is equal to the input feature matrix X; for 'layer 2': input is $H^1$ and output is $H^2$; for 'layer 3': input is $H^2$ and output is $H^3$, where $H^3$ is equal to so-called 'matrix Z'. It is noted that N in $H^{(N)}$ represents the total layers of GCN. Each layer uses the 1-layer GCN formula to extract graph features further, where 'graph features' indicate the relative frequencies of neighboring graph nodes in accordance with one or more embodiments.

Through K-layer graph convolution calculation, the output of GCN model is an output matrix (that can be called "matrix Z") which has the same size (e.g., N * N, where N=6) as the input feature matrix X. Each row in matrix Z is the node embedding (also referred to as a vector) of a graph node. For example, the first row in matrix Z is the node embedding of node 0, which looks like an N-dimensional vector and each dimension (e.g., each column) in such a vector is a floating-point number, where an example node embedding of node 0 is depicted in FIG. 14. In FIG. 14, the node embedding of graph node 0 is a 6-dimensional vector (0.12, 0.28, 0.1, 0.2, 0.15, 0.39), where the second column (i.e., the second vector dimension) is the floating-point number 0.28; more will be discussed regarding FIG. 14 below. For each graph node, the GCN model (e.g., model 218) extracts features (here, relative frequencies) of its neighboring nodes in order to obtain each graph node's node embedding. Node embeddings are a way of representing nodes as vectors. Network or node embedding captures the topology of the network. The node embeddings rely on a notion of similarity. For a 3-layer GCN, software application 204 (which may employ and/or use an interface of the GCN model 218) is configured to input a feature matrix X, provide the related adjacency matrix A, randomly initialize three parameter matrix W of three layers respectively. Then, through the calculation of 3 layers using the 1-layer GCN formula: Feature matrix X->$H^1$->$H^2$->matrix Z (aka $H^3$). Each row of the resulting matrix Z is the corresponding node embedding of each graph node. As understood by one of ordinary skill in the art, CNN (Convolutional Neural Networks) must be trained before being used for image recognition or classification. Unlike CNN, without training, GCN still can be used to extract graph features just with a randomly initialized parameter matrix for each layer.

As discussed above, software application 204 is configured to input feature matrix 224 (e.g., feature matrix X) of token sky map 220 of non-original-meaning emoticon tokens and adjacency matrix 222 to GCN model 218, which outputs an output matrix 226 (e.g., matrix Z) with a node embedding for each node (which is a row in matrix Z). Analogously, software application 204 is configured to input feature matrix 234 (e.g., feature matrix X) of token sky map 230 of plaintext tokens and adjacency matrix 232 to GCN model 218, which generates output matrix 236 (e.g., matrix Z) with a node embedding for each node (which is a row in matrix Z).

Referring to FIG. 3, at block 310, software application 204 is configured to determine a similarity or overlap between the node embeddings of (a selected) an emoticon graph node in the token sky map 220 for all emoticon tokens and a (selected) plaintext graph node in the token sky map 230 for all plaintext tokens. The cosine similarity between the node embeddings of two token graph nodes being close to 1 indicates that those two graph nodes have a very similar neighborhood distribution structure, thereby indicating that the emoticon graph node can overlap the plaintext graph node; otherwise, the two token graph nodes have a different neighborhood distribution structure and cannot be overlapped. For example, software application 204 is configured to determine if the cosine similarity between the node embeddings of the selected emoticon graph node in the token sky map 220 for all emoticon tokens and the selected plaintext graph node in the token sky map 230 for all plaintext tokens reaches a preset threshold (e.g., 0.75, 0.8, 0.9). In response to the preset threshold being met between the selected emoticon graph node and the selected plaintext graph node, this indicates the emoticon graph node and the plaintext graph node have a very similar distribution of neighboring nodes' relative frequencies. Accordingly, the selected emoticon graph node and its neighboring nodes match the selected plaintext graph node and its neighboring nodes, and therefore, the selected emoticon graph node can be translated by and/or have the same meaning as the selected plaintext graph node.

Furthermore, determining an overlap of the two sky maps starts by software application 204 finding the two graph nodes with index zero from the two sky maps respectively and then checking if the selected two graph nodes have a very similar neighborhood distribution structure or not, according to calculated cosine similarity. If the answer is "YES", then the two graph nodes with index 0 from two token sky maps can be overlapped together. If the answer is "NO", then software application 204 continues to select graph nodes with the subsequent node index one after one from the plaintext token sky map until the emoticon token graph node with index 0 can be overlapped with a plaintext token graph node with some subsequent node index, and/or until all plaintext token graph nodes have been tried. After the emoticon token graph node with index 0 has been located in the plaintext token sky map, software application 204 continues to determine the location of other emoticon token graph nodes with subsequent node indexes in the plaintext token sky map one after one, until all emoticon token graph nodes have been located in the plaintext token sky map. The result of overlapping nodes in token sky map 220 onto nodes of token sky map 230 results in overlapped token sky map 280 that has the plaintext meanings of non-original-meaning emoticon token graph nodes. As discussed further below, FIGS. 14, 15, 16, and 20 provide example details of determining the overlap of two topological graphs, particularly token sky maps 220, 230 according to one or more embodiments of the invention.

Referring to FIG. 3, at block 312, software application 204 is configured to cause a graphical display, for example, using a graphical user interface (e.g., GUI 260), of a plaintext translation for a purely non-original-meaning emoticon sentence/message on a device, such as (receiving/viewing) device 252. In an example, a (sending) device 250 can be used to generate and send/post/upload the purely non-original-meaning emoticon sentence/message to (receiving) device 252, such that the user of device 252 can receive/access/view the purely non-original-meaning emoticon sentence/message. While in route to device 252, upon receipt by device 252, and/or as device 252 accesses a website presenting the purely non-original-meaning emoticon sentence/message, software application 204 is configured to decode and present/send the decoded purely non-original-meaning emoticon sentence/message for rendering, for example, via GUI 260, the plaintext meaning of the decoded purely non-original-meaning emoticon sentence on device 252. One or more functions of software application 204 may be executed on and/or implemented by device 252, and one or more software applications on device 252 and other devices 244, 250 can access overlapped token sky map 280 to determine and extract the plaintext meaning of non-original-meaning emoticons.

Figure 19:
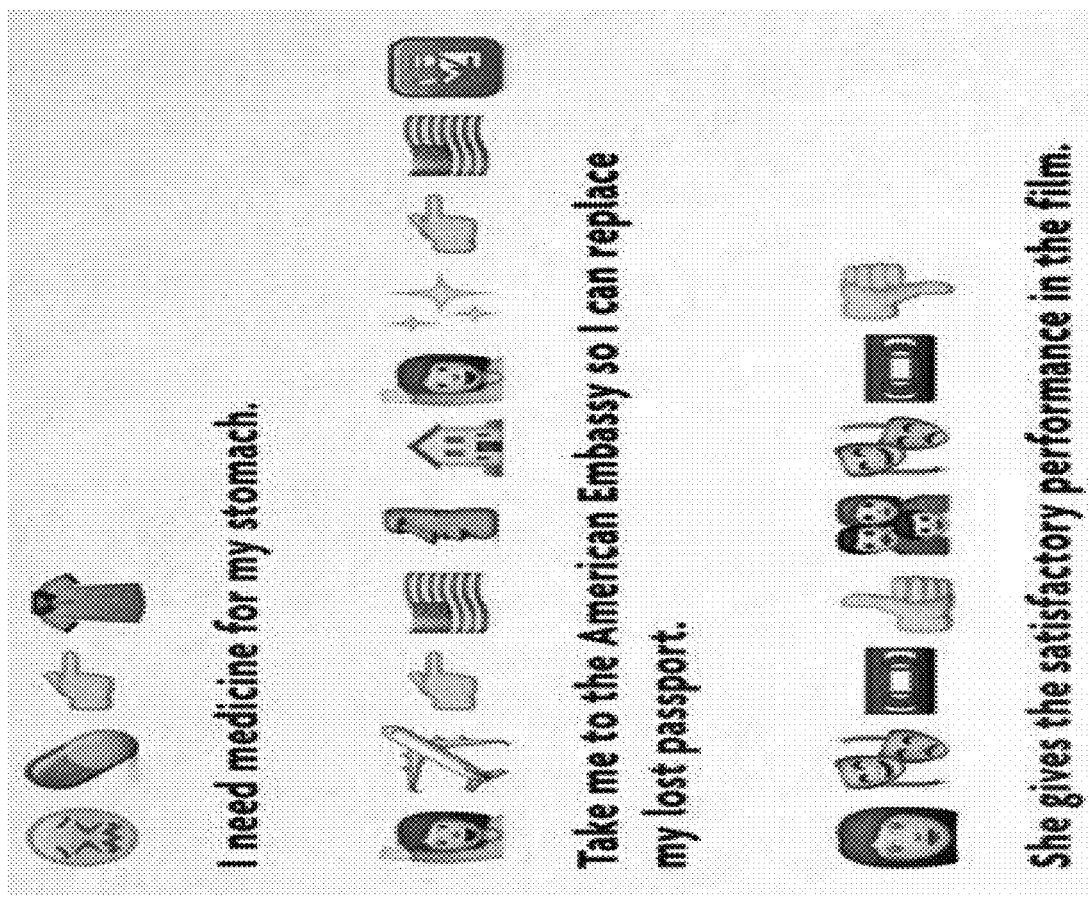
FIG. 19 depicts various graphical displays of examples of decoded translations/meanings of non-original-meaning emoticon sentences/message according to one or more embodiments of the present invention.

For example, an example purely non-original-meaning emoticon sentence/message is received from (sending) device 250, and software application 204 is configured to determine that the emoticons in the received emoticon message match a portion 1702 (some emoticons) of the token sky map 220 of emoticon tokens in FIG. 17. Software application 204 determines that this portion 1702 overlaps a portion 1704 of token sky map 230 of the plaintext tokens in FIG. 17. It should be appreciated that FIG. 17 depicts a simplified token sky map of emoticons and a simplified token sky map of plaintext, while FIG. 18 depicts an overlapped token sky map. Software application 204 is configured to determine, generate, and display view 1802 of the overlapped token sky map 1802 for view by the user of (receiving) device 252 along with the translations of emoticons window 1804 in FIG. 18. In addition to FIG. 18, there are a variety of windows and display techniques in which software application 204 can cause translations of non-original-meaning emoticon sentences/message to be graphically displayed in GUI 260 of (receiving) device 252, as depicted in FIG. 19. Additionally and/or alternatively, upon receiving the non-original-meaning emoticon sentence/message, software application 204 can search and find matched to emoticons in overlapped token sky map 280.

Moreover, software application 204 can cause the display of the most likely interpretations/meanings of the non-original-meaning emoticons on the user interface (UI) of any of the devices 244, 250, 252 according to one or more embodiments of the invention. After determining the distribution location of the non-original-meaning-emoticon token sky map 220 in the plaintext token sky map 230, the plaintext token (i.e., a word, phrase, etc.) corresponding to each emoticon token can be displayed on the online communication window (e.g., chat window) for users (of devices 244, 250, 252) to help them understanding better the non-original-meaning emoticons. In one or more embodiments, software application 204 can cause the original meaning of emoticons to be displayed on the UI at the same time as the non-original meanings.

It should be appreciated that software application 204 can collect adequate (massive) historical data to build data sets 210, 212. There is no need to build a new token sky map for emoticon tokens each time a new emoticon message is received because the emoticons in the new message can be matched to emoticon tokens in token sky map 220, and token sky map 220 has previously been matched/overlapped to token sky map 230 for plaintext tokens in overlapped token sky map 280.

Figure 20:
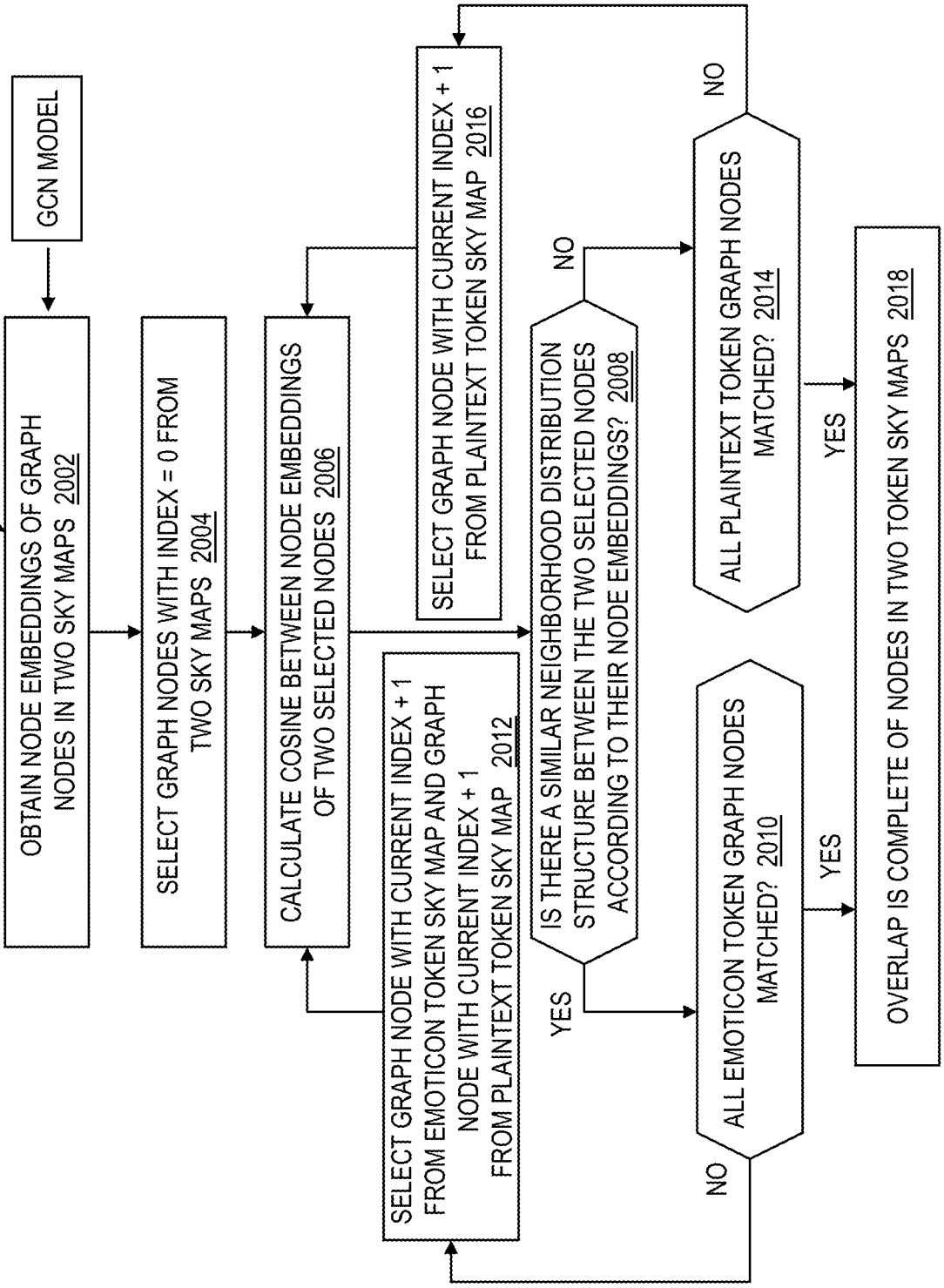
FIG. 20 is a flowchart of a computer-implemented process for overlapping a non-original-meaning-emoticon token sky map with a plaintext token sky map to identify the distribution location of the non-original-meaning emoticons according to one or more embodiments of the present invention.

Now, turning to FIG. 20 for further details regarding the overlap of token sky maps, a flowchart of a computer-implemented process 2000 is provided to identify the distribution location of the non-original-meaning-emoticon token sky map 220 in the plaintext token sky map 230.

At block 2002, software application 204 is configured to obtain node embeddings of graph nodes in two sky maps, for example, token sky map 220 for non-original-meaning emoticon tokens and token sky map 230 for plaintext tokens. As discussed herein, GCN model 218 is configured to receive input feature matrix 224 for token sky map 220 of non-original-meaning emoticon tokens and generate output matrix 226 with node embeddings for each of the nodes in token sky map 220 for non-original-meaning emoticon tokens. Similarly, GCN model 218 is configured to receive input feature matrix 234 for token sky map 230 of plaintext tokens and generate output matrix 236 with node embeddings for each of the nodes in token sky map 230 for plaintext tokens.

At block 2004, software application 204 is configured to select a graph node with index=0 from token sky map 220 and select a graph node with index=0 from token sky map 230. At block 2006, software application 204 is configured to calculate the cosine between node embeddings of the two selected graph nodes, for example, one node in output matrix 226 of token sky map 220 and one node in output matrix 236 of token sky map 230.

At block 2008, software application 204 is configured to check if there is a similar neighborhood distribution structure between the two selected graph nodes according to their node embeddings, which are one node in token sky map 220 and one node in token sky map 230, based on the calculation in block 2006. For example, if the cosine similarity (calculated in block 2006) between the two selected nodes reaches the preset threshold (e.g., 0.9), then there are "similar" neighborhood distribution structures between the two selected nodes; otherwise (that is, calculated cosine similarity is less than the threshold), there are "dissimilar" neighborhood distributions between the two selected nodes. Furthermore, when the node embeddings for the two selected graph nodes are similar, this means that meaning of the non-original-meaning emoticon token for the one selected graph node can be correlated to and presented by the meaning of the plaintext token for the other selected graph node, thereby decoding the meaning of non-original-meaning emoticon token.

At block 2010, if (YES) the node embeddings for the two selected graph nodes are determined to be similar, software application 204 is configured to check if all emoticon tokens graph nodes in token sky map 220 (and/or output matrix 226) have been matched to a plaintext node in token sky map 230. At block 2018, if (YES) all emoticon token graph nodes have been matched in token sky map 220, software application 204 is configured to determine that the overlap of non-original-meaning emoticon tokens in token sky map 220 is complete. As such, software application 204 is configured to find, determine, and match the meaning of non-original-meaning emoticons in a new message just received to their corresponding meaning in plaintext in the overlapped token sky map 280.

At block 2012, if (NO) all emoticon token graph nodes have not been matched in token sky map 220 to plaintext tokens in token sky map 230, software application 204 is configured to select a graph node with index=current index value+1 (i.e., subsequent index value) from emoticon token sky map 220 and select a graph node with index=current index value+1 (i.e., subsequent index value) from plaintext token sky map 230; flow proceeds to block 2006 to calculate the cosine between node embeddings of the selected graph node with index=current index value+1 from emoticon token sky map 220 and the selected graph node with index=current index value+1 from plaintext token sky map 230.

At block 2014, if (NO (at block 2008)) the node embeddings for the two selected graph nodes are determined to be dissimilar, software application 204 is configured to check if all plaintext tokens graph nodes in token sky map 230 (and/or output matrix 236) have been matched to an emoticon node in token sky map 220. If (YES) they are mapped, flow proceeds to block 2018. If (NO) all plaintext token graph nodes have not been matched in token sky map 230 to emoticon tokens in token sky map 220, software application 204 is configured to select a graph node with index=current index value+1 from plaintext token sky map 230, and flow proceeds to block 2006 to calculate the cosine between node embeddings of the selected graph node with index=current index value+1 from plaintext token sky map 230 and the previously selected graph node with index=0 (or current index value) from emoticon token sky map 220.

Figure 15:
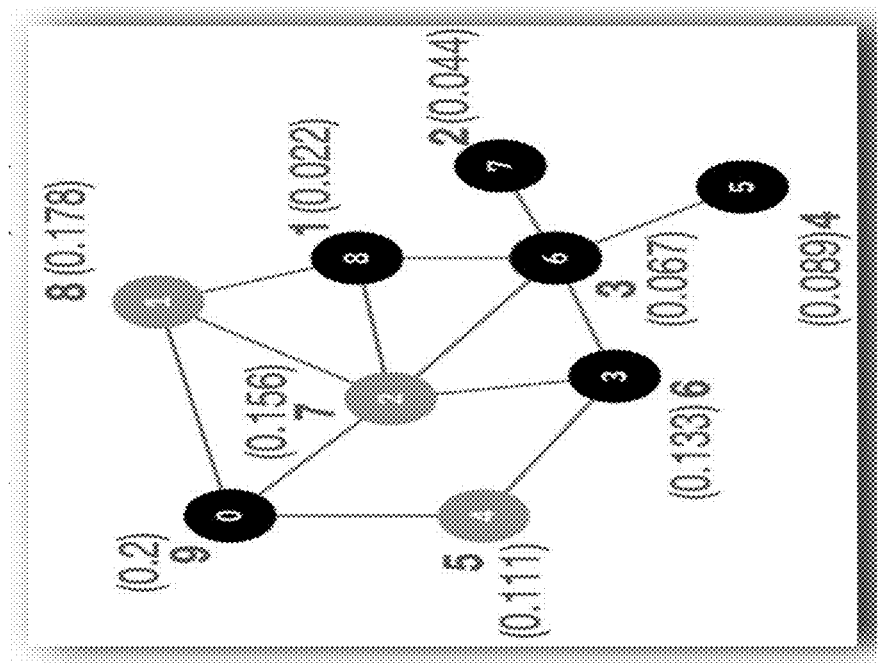
FIG. 15 depicts an example plaintext token sky map along with the node embedding of graph node 0 according to one or more embodiments of the present invention.
Figure 16:
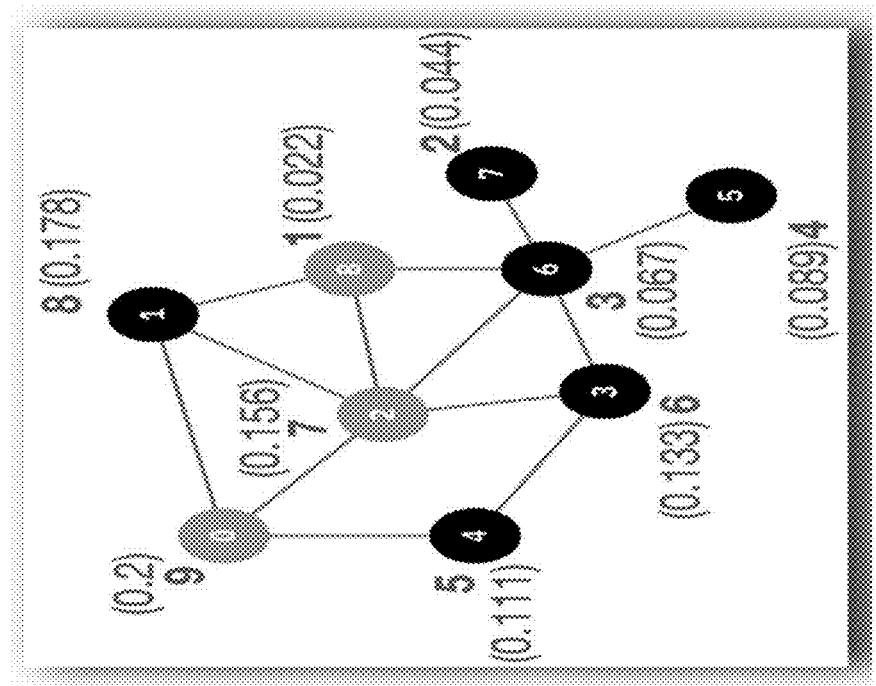
FIG. 16 depicts an example plaintext token sky map along with the node embedding of graph node 1 according to one or more embodiments of the present invention.

The following is an example further illustrating the overlap process with FIGS. 14, 15, and 16. The overlap process (by software application 204) starts from the emoticon token graph node and plaintext token graph node with index=0, and checks if their respective distribution of neighboring nodes' relative frequencies are similar, according to their respective node embeddings calculated from GCN model 218. For example, the node embedding of the emoticon-token graph node (node 0) in FIG. 14 is not similar to the node embedding of the plaintext-token graph node (node 0) in FIG. 15. Thus, the overlap process (by software application 204) tries to check the emoticon token graph node (node 0) with the subsequent plaintext token graph node (node 1) in FIG. 16. The overlap process (by software application 204) finds that the node embedding of the emoticon token graph node (node 0) in FIG. 14 is very similar to the node embedding of the plaintext-token graph node (node 1) in FIG. 16, so these two overlapping nodes are most likely to have the same meaning. Then, the overlap process continues to check the subsequent emoticon token graph node (node 1) and the subsequent plaintext token graph node (node 2) until the emoticon token graph node with maximum node index is overlapped.

The node embeddings of an emoticon graph node and a plaintext graph node could have different sizes. For example, the node embedding of an emoticon graph node is a multi-dimensional vector with 6 dimensions in FIG. 14, but the node embeddings of a plaintext graph node is a multi-dimensional vector with 9 dimensions in FIGS. 15 and 16. As such, before calculating cosine similarity between them, software application 204 can use and/or employ software applications that use a standard dimensionality reduction technique, such as, for example, Principal Component Analysis (PCA), to convert node embeddings of all emoticon and plaintext graph nodes to two-dimensional vectors.

To continue the example illustrating the overlap process, the following scenario is provided. The example node embeddings from FIGS. 14, 15, and 16 are used as below. Example node embedding of node 0 in FIG.14 is denoted node embedding A (0.12, 0.28, 0.1, 0.2, 0.15, 0.39). Example node embedding of node 0 in FIG. 15 is denoted node embedding B (0.4, 0.3, 0.05, 0.02, 0.1, 0.01, 0.0, 0.1, 0.0). Example node embedding of node 1 in FIG. 16 is denoted node embedding C (0.1, 0.3, 0.1, 0.2, 0.15, 0.4, 0.1, 0.12, 0.02). Node embeddings A, B and C have different sizes, where 'size' indicates the number of a node embedding's dimensions. For example, A is a 6-dimensional vector and the size of A is 6; C is a 9-dimensional vector and the size of C is 9. As noted herein, A, B and C can be processed through PCA (Principal Component Analysis), and it is assumed that the respective resulting 3-dimensional vectors of A, B and C (i.e., node embeddings) are as below. For A, after using PCA, the result is (0.12, 0.28, 0.1, 0.2, 0.15, 0.39)->(0.01, 0.62, 0.03). For B, after using PCA, the result is (0.4, 0.3, 0.05, 0.02, 0.1, 0.01, 0.0, 0.1, 0.0)->(0.75, 0.02, 0.01). For C, after using PCA, the result is (0.1, 0.3, 0.1, 0.2, 0.15, 0.4, 0.1, 0.12, 0.02)->(0.02, 0.7, 0.08). Now, the cosine between A and C is calculated: cosine((0.01, 0.62, 0.03), (0.02, 0.7, 0.08)), the calculation result is so close to value 1 (i.e., over the preset threshold; this means 'similar'). However, cosine between A and B is calculated: cosine ((0.01, 0.62, 0.03), (0.75, 0.02, 0.01)), the calculation result is not close to value 1 (i.e., less than the threshold; this means 'dissimilar').

Figure 21:
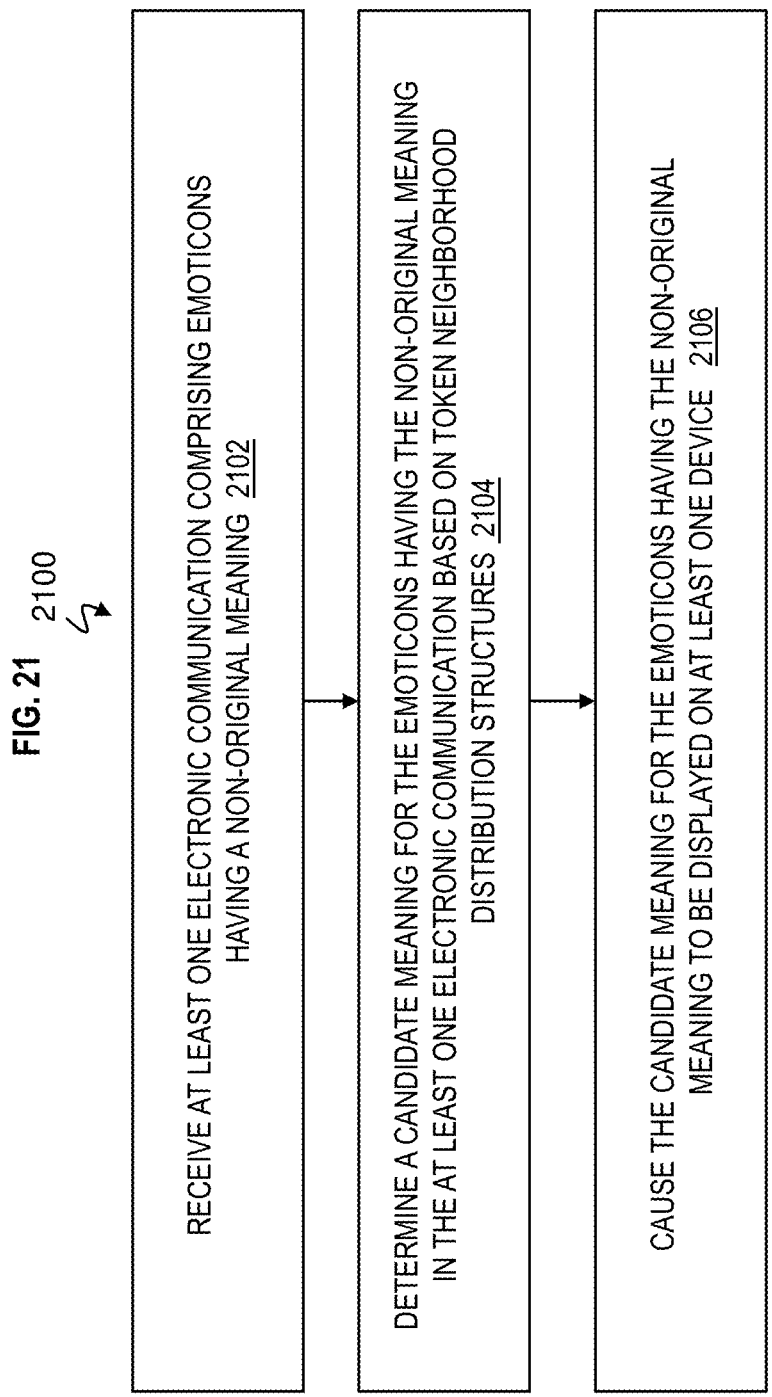
FIG. 21 is a flowchart of a computer-implemented method for decoding electronic communications with token sky maps and generating a graphical display of the decoded electronic communications according to one or more embodiments of the present invention.

FIG. 21 is a flowchart of a computer-implemented method 2100 for decoding electronic communications with token sky maps and generating a graphical display of the decoded electronic communications in accordance with one or more embodiments of the invention. Computer-implemented method 2100 may be performed using computer system 202 in FIG. 2. Functions of computer systems can use and/or implemented in hardware components of hardware and software layer 60 and/or workloads of workload layer 90 depicted in FIG. 23.

At block 2102 of computer-implemented method 2100, software application 204 of computer system 202 is configured to receive and/or access at least one electronic communication comprising emoticons having a non-original meaning. The electronic communication could have been sent over network 270, posted in an electronic message board, chat, etc., and/or electronically generated for any social media website by any of devices 244, 250, 252.

At block 2104, software application 204 of computer system 202 is configured to determine a candidate meaning for the emoticons having the non-original meaning in the at least one electronic communication based on token neighborhood distribution structures. The candidate meaning is the plaintext meaning of the non-original meaning emoticons in the sentence.

At block 2106, software application 204 of computer system 202 is configured to cause the candidate meaning for the emoticons having the non-original meaning to be displayed on at least one device. For example, software application 204 can cause the plaintext translations of the non-original meaning emoticons to be displayed on, for example, receiving device 252 and/or any other devices 244, 250.

The token neighborhood distribution structures comprise a first topological graph (e.g., token sky map 220) comprising first nodes and a second topological graph (e.g., token sky map 230) comprising second nodes.

Determining the candidate meaning for the emoticons having the non-original meaning in the at least one electronic communication comprises: finding a match of the emoticons having the non-original meaning with first nodes in a first topological graph (e.g., token sky map 220) of the token neighborhood distribution structures; and using an overlap of first nodes in the first topological graph (e.g., token sky map 220) and second nodes in a second topological graph (e.g., token sky map 230) of the token neighborhood distribution structures in order to determine the candidate meaning for the emoticons, the second topological graph (e.g., token sky map 230) comprising plaintext words.

The token neighborhood distribution structures comprise a first topological graph (e.g., token sky map 220) and a second topological graph (e.g., token sky map 230), each being an undirected and unweighted topological graph.

The emoticons having the non-original meaning in the at least one electronic communication correlate to first nodes in a first topological graph (e.g., token sky map 220) of the token neighborhood distribution structures; the first nodes overlap second nodes in a second topological graph (e.g., token sky map 230) of the token neighborhood distribution structures, the second nodes having a plaintext meaning that corresponds to (provides) the candidate meaning for the emoticons.

The token neighborhood distribution structures comprise a non-original- meaning emoticon topological graph (e.g., token sky map 220) and a plaintext topological graph (e.g., token sky map 230), the candidate meaning for the emoticons being determined based on a similarity (e.g., cosine similarity) between node embeddings of the non-original-meaning emoticon topological graph (e.g., token sky map 220) and the plaintext topological graph (e.g., token sky map 230). The candidate meaning for the emoticons is rendered in a graphical user interface (e.g., GUI 260) to decode a representation of the emoticons. FIGS. 18 and 19 illustrate various graphical displays on any of the devices 244, 250, 252 of the candidate meanings of different purely non-original-meaning emoticons in sentences which have been decoded for view by users.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 22:
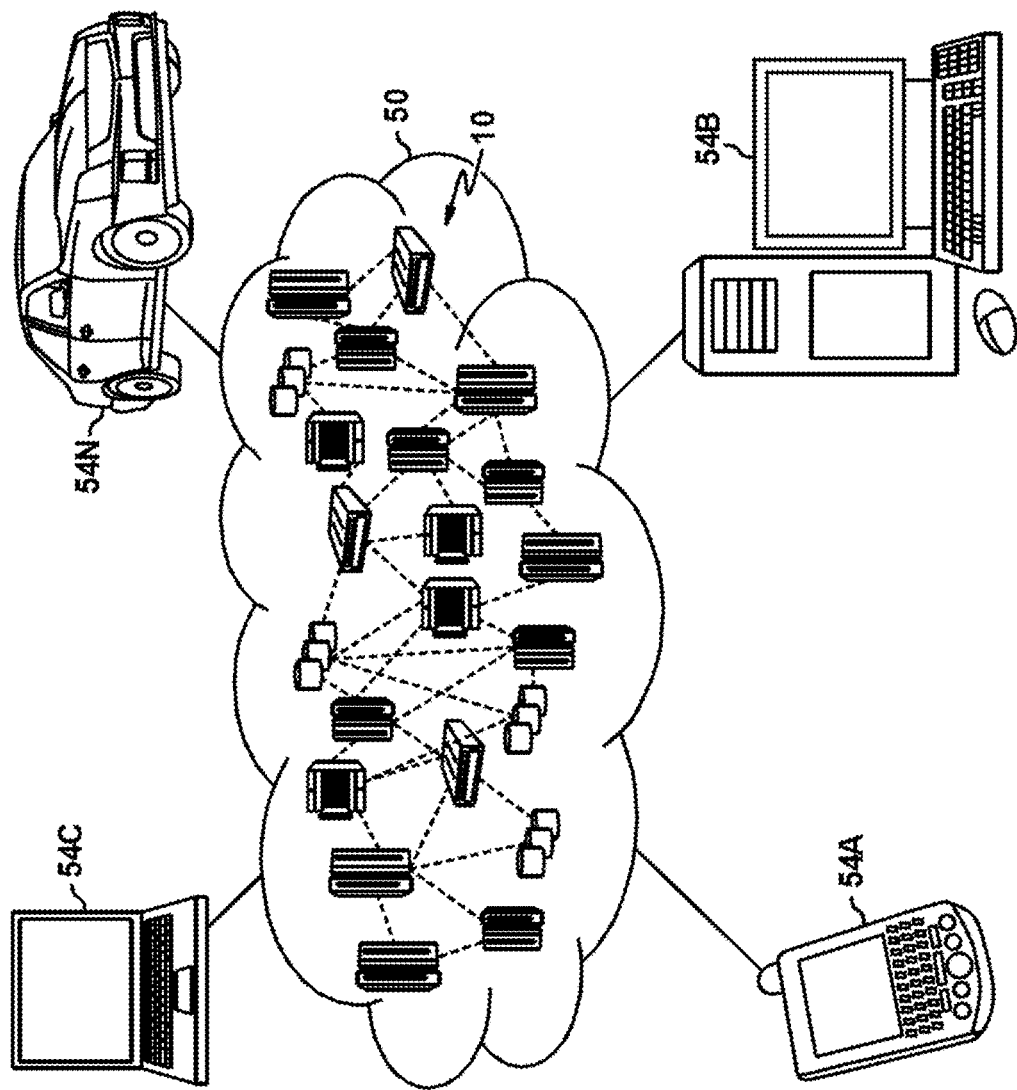
FIG. 22 depicts a cloud computing environment according to one or more embodiments of the present invention.

Referring now to FIG. 22, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 22 are intended to be illustrative only and that computing nodes 10 and cloud computing environment 50 can communicate with any type of computerized device over any type of network and/or network addressable connection (e.g., using a web browser).

Figure 23:
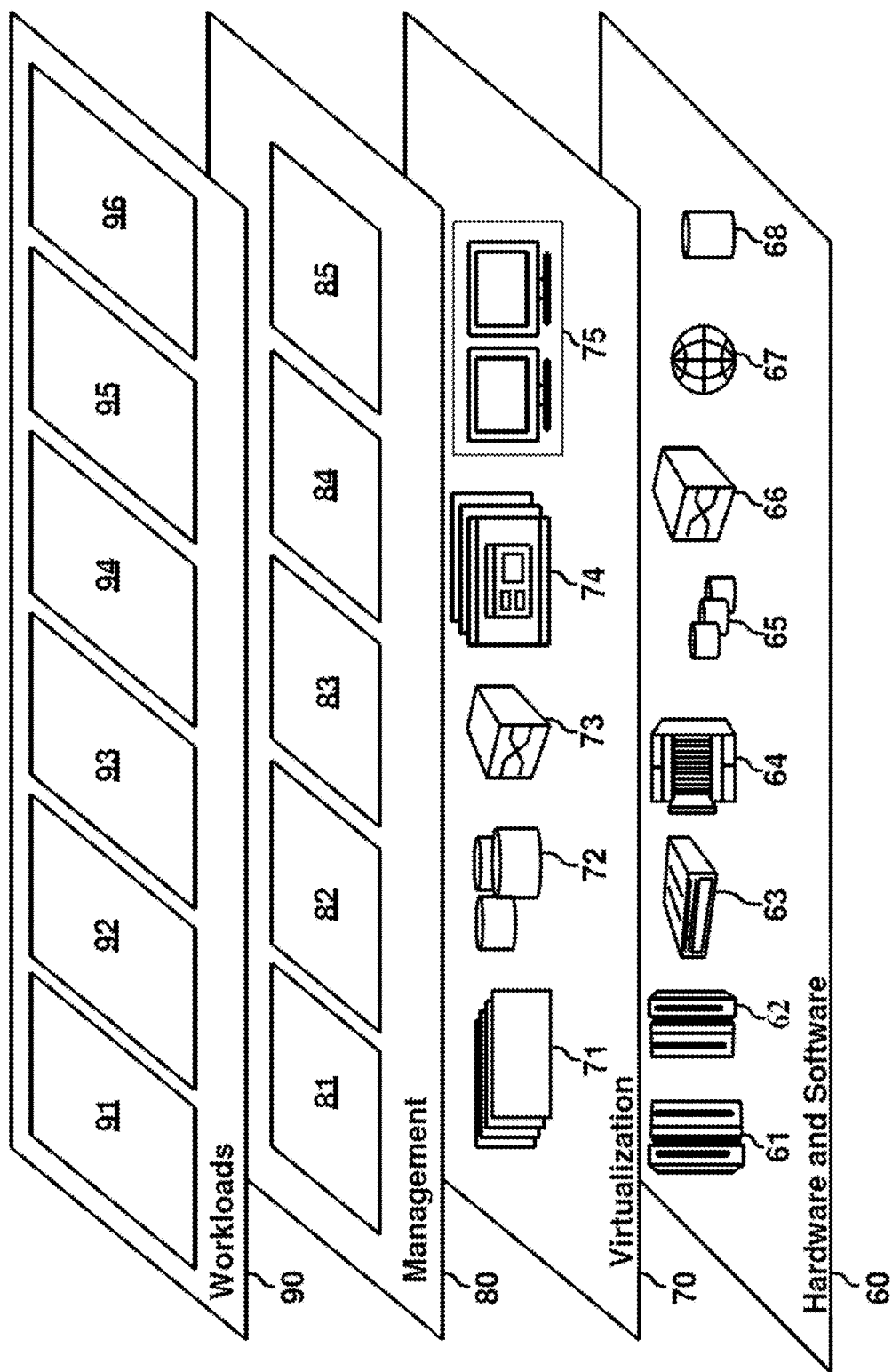
FIG. 23 depicts abstraction model layers according to one or more embodiments of the present invention.

Referring now to FIG. 23, a set of functional abstraction layers provided by cloud computing environment 50 (FIG. 22) is shown. It should be understood in advance that the components, layers, and functions shown in FIG. 23 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. Workloads and functions 96 may include various software applications in (and/or performs various functions on behalf) computer system(s) 202, devices 244, sending device 250, and receiving device 252, etc., discussed herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving at least one electronic communication comprising emoticons having a non- original meaning;
   determining a candidate meaning for the emoticons having the non-original meaning in the at least one electronic communication, the determining based at least in part on token neighborhood distribution structures, wherein the token neighborhood distribution structures comprise a first topological graph comprising first nodes and a second topological graph comprising second nodes, the first nodes being emoticon tokens as pictorial representations, the second nodes being plaintext tokens as words in plain text; and
   causing the candidate meaning for the emoticons having the non-original meaning to be displayed on at least one device.

2. The computer-implemented method of claim 1, wherein determining the candidate meaning for the emoticons having the non-original meaning in the at least one electronic communication comprises:
   finding a match of the emoticons having the non-original meaning with the first nodes in the first topological graph of the token neighborhood distribution structures; and
   using an overlap of the first nodes in the first topological graph and the second nodes in a second topological graph of the token neighborhood distribution structures in order to determine the candidate meaning for the emoticons, the second topological graph comprising plaintext words.

3. The computer-implemented method of claim 1, wherein the first topological graph and the second topological graph are each an undirected and unweighted topological graph.

4. The computer-implemented method of claim 1, wherein:
   the emoticons having the non-original meaning in the at least one electronic communication correlate to the first nodes in the first topological graph of the token neighborhood distribution structures; and
   the first nodes overlap the second nodes in a-the second topological graph of the token neighborhood distribution structures, the second nodes having a plaintext meaning that corresponds to the candidate meaning for the emoticons.

5. The computer-implemented method of claim 1, wherein the token neighborhood distribution structures comprise a non-original-meaning emoticon topological graph as the first topological graph and a plaintext topological graph as the second topological graph, the candidate meaning for the emoticons being determined based on a similarity between node embeddings of the non-original-meaning emoticon topological graph and the plaintext topological graph.

6. The computer-implemented method of claim 1, wherein the candidate meaning for the emoticons is rendered in a graphical user interface to decode a representation of the emoticons.

7. A system comprising:
   a memory having computer readable instructions; and
   one or more processors for executing the computer readable instructions, the computer readable instructions controlling the one or more processors to perform operations comprising:
   receiving at least one electronic communication comprising emoticons having a non-original meaning;
   determining a candidate meaning for the emoticons having the non-original meaning in the at least one electronic communication, the determining based at least in part on token neighborhood distribution structures, wherein the token neighborhood distribution structures comprise a first topological graph comprising first nodes and a second topological graph comprising second nodes, the first nodes being emoticon tokens as pictorial representations, the second nodes being plaintext tokens as words in plain text; and
   causing the candidate meaning for the emoticons having the non-original meaning to be displayed on at least one device.

8. The system of claim 7, wherein determining the candidate meaning for the emoticons having the non-original meaning in the at least one electronic communication comprises:
   finding a match of the emoticons having the non-original meaning with the first nodes in the first topological graph of the token neighborhood distribution structures; and
   using an overlap of the first nodes in the first topological graph and the second nodes in a the second topological graph of the token neighborhood distribution structures in order to determine the candidate meaning for the emoticons, the second topological graph comprising plaintext words.

9. The system of claim 7, wherein the first topological graph and the second topological graph are each an undirected and unweighted topological graph.

10. The system of claim 7, wherein:
the emoticons having the non-original meaning in the at least one electronic communication correlate to the first nodes in a-the first topological graph of the token neighborhood distribution structures; and
the first nodes overlap the second nodes in a second topological graph of the token neighborhood distribution structures, the second nodes having a plaintext meaning that corresponds to the candidate meaning for the emoticons.

11. The system of claim 7, wherein the token neighborhood distribution structures comprise a non-original-meaning emoticon topological graph as the first topological graph and a plaintext topological graph as the second topological graph, the candidate meaning for the emoticons being determined based on a similarity between node embeddings of the non-original-meaning emoticon topological graph and the plaintext topological graph.

12. The system of claim 7, wherein the candidate meaning for the emoticons is rendered in a graphical user interface to decode a representation of the emoticons.

13. A computer program product comprising a computer readable storage medium having program instructions embodied therewith, the program instructions executable by one or more processors to cause the one or more processors to perform operations comprising:
receiving at least one electronic communication comprising emoticons having a non-original meaning;
determining a candidate meaning for the emoticons having the non-original meaning in the at least one electronic communication, the determining based at least in part on token neighborhood distribution structures, wherein the token neighborhood distribution structures comprise a first topological graph comprising first nodes and a second topological graph comprising second nodes, the first nodes being emoticon tokens as pictorial representations, the second nodes being plaintext tokens as words in plain text; and
causing the candidate meaning for the emoticons having the non-original meaning to be displayed on at least one device.

14. The computer program product of claim 13, wherein determining the candidate meaning for the emoticons having the non-original meaning in the at least one electronic communication comprises:
finding a match of the emoticons having the non-original meaning with the first nodes in the first topological graph of the token neighborhood distribution structures; and
using an overlap of the first nodes in the first topological graph and the second nodes in a second topological graph of the token neighborhood distribution structures in order to determine the candidate meaning for the emoticons, the second topological graph comprising plaintext words.

15. The computer program product of claim 13, the first topological graph and the second topological graph are each an undirected and unweighted topological graph.

16. The computer program product of claim 13, wherein:
the emoticons having the non-original meaning in the at least one electronic communication correlate to the first nodes in the first topological graph of the token neighborhood distribution structures; and
the first nodes overlap the second nodes in a second topological graph of the token neighborhood distribution structures, the second nodes having a plaintext meaning that corresponds to the candidate meaning for the emoticons.

17. The computer program product of claim 13, wherein the token neighborhood distribution structures comprise a non-original-meaning emoticon topological graph as the first topological graph and a plaintext topological graph as the second topological graph, the candidate meaning for the emoticons being determined based on a similarity between node embeddings of the non-original-meaning emoticon topological graph and the plaintext topological graph.

\* \* \* \* \*